US011467278B2

(12) United States Patent
Brooker et al.

(10) Patent No.: US 11,467,278 B2
(45) Date of Patent: Oct. 11, 2022

(54) SYSTEM AND METHOD OF DETECTING OBJECTS

(71) Applicant: SENSING MANAGEMENT PTY LIMITED, North Sydney (AU)

(72) Inventors: Graham Brooker, Sydney (AU); David Johnson, Sydney (AU); Javier Martinez, Sydney (AU)

(73) Assignee: SENSING MANAGEMENT PTY LIMITED, North Sydney (AU)

( * ) Notice: Subject to any disclaimer, the term of this patent is extended or adjusted under 35 U.S.C. 154(b) by 253 days.

(21) Appl. No.: 16/627,262

(22) PCT Filed: Jun. 29, 2018

(86) PCT No.: PCT/AU2018/050669
§ 371 (c)(1),
(2) Date: Dec. 27, 2019

(87) PCT Pub. No.: WO2019/000047
PCT Pub. Date: Jan. 3, 2019

(65) Prior Publication Data
US 2020/0142029 A1  May 7, 2020

(30) Foreign Application Priority Data

Jun. 29, 2017  (AU) ................ 2017902514

(51) Int. Cl.
*G01S 13/87* (2006.01)
*G01S 7/35* (2006.01)
(Continued)

(52) U.S. Cl.
CPC ............ *G01S 13/87* (2013.01); *G01S 7/0232* (2021.05); *G01S 7/352* (2013.01); *G01S 7/415* (2013.01);
(Continued)

(58) Field of Classification Search
CPC ........ G01S 13/87; G01S 7/0232; G01S 7/352; G01S 7/415; G01S 13/583; G01S 7/023;
(Continued)

(56) References Cited

U.S. PATENT DOCUMENTS

| 4,328,487 A | * | 5/1982 | Cheal | ................. G08B 13/2497 |
| | | | | 333/237 |
| 5,345,539 A | * | 9/1994 | Webb | ..................... G01S 7/417 |
| | | | | 342/350 |

(Continued)

FOREIGN PATENT DOCUMENTS

| WO | 2015/169709 A1 | 11/2015 |
| WO | 2016/164031 A1 | 10/2016 |

OTHER PUBLICATIONS

Extended European Search Report, dated Jan. 25, 2021, for European Application No. 18823415.7-1206, 10 pages.
(Continued)

*Primary Examiner* — Donald H B Braswell
(74) *Attorney, Agent, or Firm* — Seed Intellectual Property Law Group LLP

(57) ABSTRACT

Object detection systems and methods are provided. An object detection system comprises a plurality of nodes, each node having a transmitter configured to transmit a radar signal as a beam, and one or more receivers configured to receive a reflected radar signal. The nodes and transmitters are arranged such that the radar beam of one transmitter at least partly overlaps with the radar beam from the transmitter at an adjacent one of the nodes. The object detection system comprises a processor configured to receive a digitised signal from each node, process the digitised signal to detect characteristics of any Doppler effects created by the movement of an object through one or more of the radar beams, compare the Doppler characteristics with Doppler
(Continued)

signatures associated with known objects, and thereby classify the object.

17 Claims, 19 Drawing Sheets

(51) Int. Cl.
 *G01S 7/41* (2006.01)
 *G01S 13/58* (2006.01)
 *G01S 7/02* (2006.01)
(52) U.S. Cl.
 CPC ............. *G01S 13/583* (2013.01); *G01S 7/023* (2013.01); *G01S 7/356* (2021.05); *G01S 7/417* (2013.01)
(58) Field of Classification Search
 CPC ........ G01S 7/356; G01S 7/417; G01S 13/536; G01S 13/56; G01S 13/723; G01S 13/44; G01S 13/32; G01S 13/48
 See application file for complete search history.

(56) References Cited

U.S. PATENT DOCUMENTS

| | | |
|---|---|---|
| 2003/0222778 A1 | 12/2003 | Piesinger |
| 2008/0136702 A1 | 6/2008 | Tsuchihashi et al. |
| 2009/0174589 A1* | 7/2009 | Moraites ................. F41G 3/147 342/14 |
| 2011/0084869 A1 | 4/2011 | Holly et al. |
| 2011/0254724 A1 | 10/2011 | Ricci et al. |
| 2012/0001787 A1 | 1/2012 | van Dorp |
| 2014/0097979 A1* | 4/2014 | Nohara ................... G01S 13/87 342/90 |
| 2016/0025845 A1 | 1/2016 | Allistair et al. |
| 2016/0286779 A1* | 10/2016 | Guice ................... A01M 1/226 |
| 2017/0086202 A1 | 3/2017 | Chen |
| 2018/0074161 A1* | 3/2018 | Rosenbaum ............. G01S 5/14 |
| 2019/0310347 A1* | 10/2019 | Harman ................. G01S 13/52 |

OTHER PUBLICATIONS

Written Opinion, International Application No. PCT/AU2018/050669, dated Aug. 16, 2018, 5 pages.

* cited by examiner

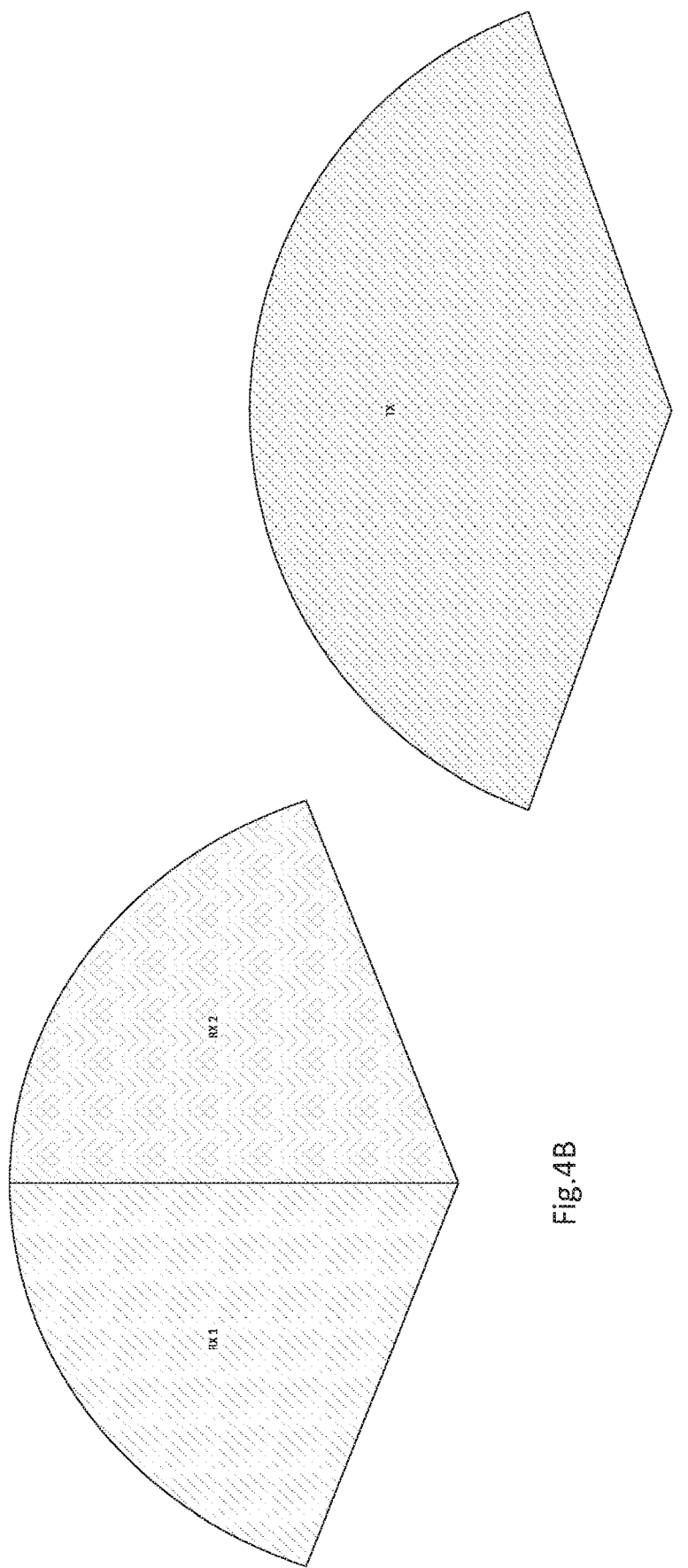

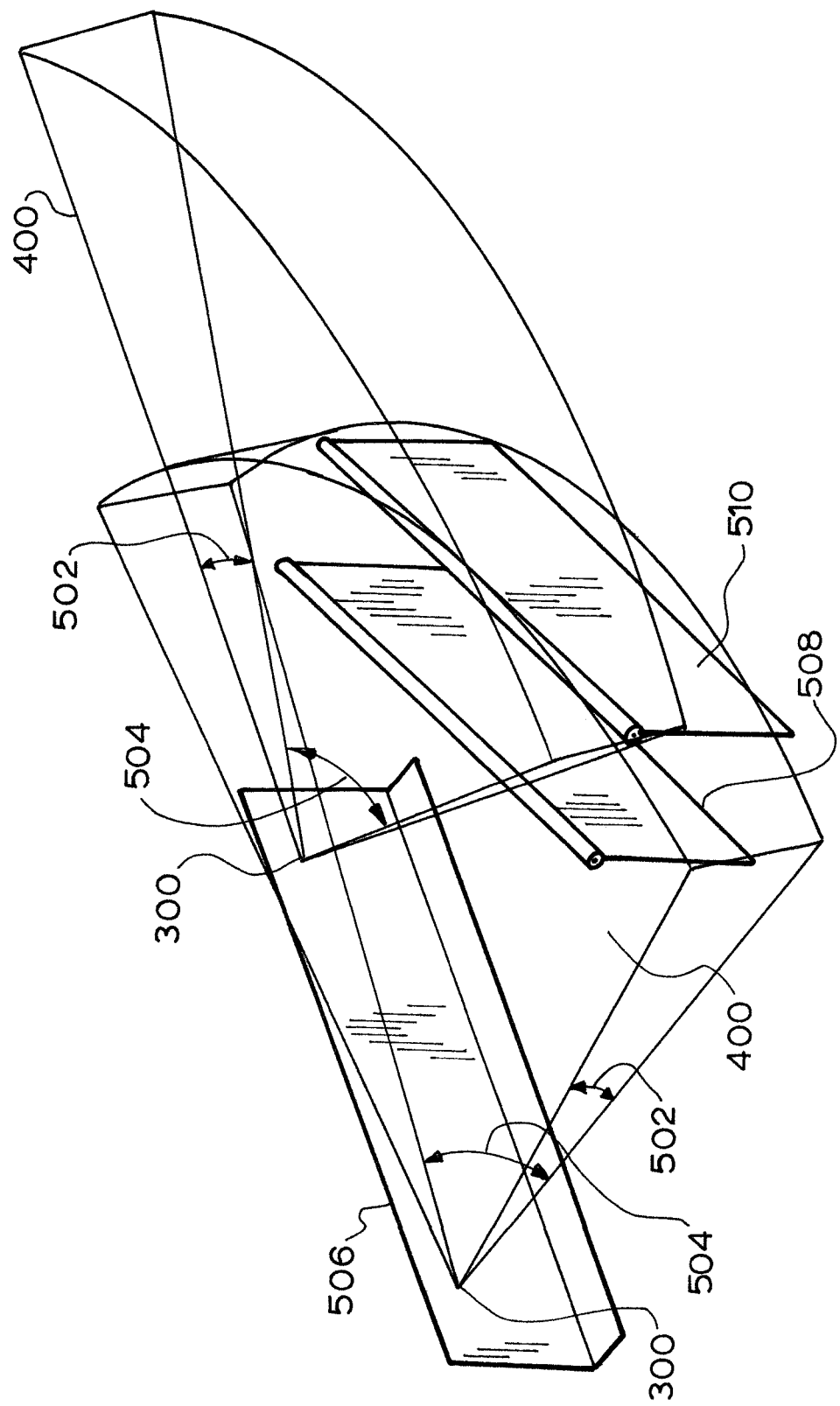

(a)

(b)

SYSTEM AND METHOD OF DETECTING OBJECTS

FIELD

This disclosure relates to an object detection system and a method of detecting objects. More particularly, the disclosure relates to an object detection system, components thereof, and a method for detecting moving objects entering a secured area.

BACKGROUND

The importance and need of monitoring secured areas, such as for example, correctional facilities, high value installations (such as those that are critical for operational reasons, such as water, gas, communication, or power installations), military bases, detention centres, ports, and intelligence agency offices is an ever present need. One particular security concern is contraband entering correctional facilities and detention centres, particularly contraband being thrown, launched or dropped into correctional facilities by parties outside the perimeter fence for retrieval by inmates within the fence.

Contraband can range from mobile phones and SIM cards through to small weapons, such as knives, razor blades, parts of a firearm, and drugs. These items are usually concealed inside small objects such as golf balls or tennis balls or soft drink/beer cans or soft drink bottles or other similar objects and then launched over a perimeter fence as projectiles. Third parties are also commonly using UAVs (unmanned aerial vehicles) to transport contraband into correctional facilities by flying the UAVs over the perimeter fence.

For military, high value installations, and intelligence installations, the site owners or operators are concerned about objects entering the secure area that can cause harm to the site or to the persons located at the site. Examples of objects of concern include improvised explosive devices (IEDs), grenades, mines, bombs and other explosive or harmful materials that may be detonated remotely or by activity proximate to the object. Such objects may be thrown over the perimeter fence or left at the perimeter of the military, high value, or intelligence installations or may be launched using some form of assistance, such as a compressed air cannon, or dropped from a UAV.

Detection of objects being launched or thrown or transported over the perimeter fence in a secured area, such as a correctional facility, is challenging. Existing surveillance and detection solutions are unable or at least find it difficult to reliably detect objects that are small or staff are unable to determine when objects come into the perimeter due to other detritus in an external area e.g. the size of a tennis ball, or size and shape of a soft drink can or bottle, or smaller. Existing surveillance systems are typically single scanning units that use high power to detect targets at long range for an entire secured site. Existing multiple unit surveillance systems typically involve transmitting a signal from one unit to another to essentially form a "trip wire" to detect passing objects. Existing surveillance systems such as radar systems are designed to observe slow moving targets that are large in size i.e. have a higher radar cross section (RCS). It is difficult for these existing systems to detect objects having a small RCS.

Detection problems are further increased due to variations in the perimeter fence topography along the fence and corners or twists in the fence line, which can create blind spots and thus can make surveillance more challenging. The approach to the perimeter fence can also often be obscured by natural features, such as trees and poor lighting.

In this specification, where reference has been made to patent specifications, other external documents, or other sources of information, this is generally for the purpose of providing a context for discussing the features of the disclosure. Unless specifically stated otherwise, reference to such external documents or such sources of information is not to be construed as an admission that such documents or such sources of information, in any jurisdiction, are prior art or form part of the common general knowledge in the art.

It is an object of at least preferred embodiments of the present disclosure to address at least one the disadvantages, and/or to at least provide the public with a useful alternative.

SUMMARY

In a first aspect, an object detection system is provided comprising plurality of nodes, each node having a transmitter configured to transmit a radar signal as a beam, and one or more receivers configured to receive a reflected radar signal; the nodes and transmitters being arranged such that the radar beam of one transmitter at least partly overlaps with the radar beam from the transmitter at an adjacent one of the nodes; the system comprising a processor configured to receive a digitised signal from each node, process the digitised signal to detect characteristics of any Doppler effects created by the movement of an object through one or more of the radar beams, compare the Doppler characteristics with Doppler signatures associated with known objects, and thereby classify the object.

The transmitted radar signals comprise continuous wave radar signals, but alternatively may comprise pulsed signals.

The transmitted radar signals are preferably constant-frequency radar signals, wherein the signals of any two overlapping beams have different frequencies. In one embodiment, the percentage overlap is about 35-65, 40-60, or about 45-55%. In one embodiment, the percentage overlap is less than about 65%, 60, 55, 50, 45, 40, less than about 35%. In one embodiment, the percentage overlap is between 30-65, 30-60, 30-55, 30-50, 30-45, 30-40, or 30-35%. In one embodiment, the percentage overlap is 35-70, 40-70, 45-70, 50-70, 55-70, 60-70 or 65-70%. In one embodiment, the percentage overlap is about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, or 69%. In one embodiment, the percentage overlap is preferably about 40-60%, particularly about 50%.

In one embodiment, the frequency difference between two overlapping beams is about 15-50 KHz, 20-45, 25-40, or 30-35 KHz. In one embodiment, the frequency difference is less than about 50 KHz, or 45, 40, 35, 30, 25, 20, or about 15 KHz apart. In one embodiment, the frequency difference is from 15 to 45 KHz apart, 15 to 40, 15 to 35, 15 to 30, 15 to 25, or 15 to 20 KHz apart. In one embodiment, the frequency difference is from 20 to 50 KHz apart, 25 to 50, 30 to 50, 35 to 50, 40 to 50, or 45 to 50 KHz apart. In one embodiment, the frequency difference is 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 KHs. In one embodiment, the frequency difference is preferably 20 to 40 KHz apart.

One or more of the nodes may comprise two receivers in a "monopulse" configuration, with the processor configured to extract bearing information from the digitised signal.

In an embodiment, any two adjacent receivers at respective adjacent nodes are angled towards each other. In one embodiment, the radial component of each receiver is between about 0-90 degrees, 5-85, 10-80, 15-75, 20-70, 25-65, 25-60, 30-55, 35-50, or between about 40-45 degrees. In one embodiment, the radial component is about 5, 10, 15, 20, 25, 30, 35, 40, 45, 50, 55, 60, 65, 70, 75, 80, or 85 degrees. In one embodiment, the radial component is between 0-85, 0-80, 0-75, 0-70, 0-65, 0-60, 0-55, 0-50, 0-45, 0-40, 0-35, 0-30, 0-25, 0-20, 0-15, 0-10, or 0-5 degrees. In one embodiment, the radial component is 5-90, 10-90, 15-90, 20-90, 25-90, 30-90, 35-90, 40-90, 45-90, 50-90, 55-90, 60-90, 65-90, 70-90, 75-90, 80-90, r 85-90 degrees. In one embodiment, the radial component is about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, or about 89 degrees.

In an embodiment, the processor is configured to process the digital signal by applying fast Fourier transforms (FFTs), particularly short-time FFTs. The processor may be configured to further process the digital signal by applying peak and/or track detection.

In an embodiment, the processor is a local or central processor and each node further comprises a node processor configured to sample, filter, and digitise the signal from the respective receiver(s), and transmit the digitised signal(s) to the local or central processor. The nodes may be linked to the local and/or central processor over a communications link.

In an embodiment, the transmitted radar signals each have a horizontal beam width of 90 to 110 degrees. However, in other embodiments the horizontal beamwidth may be 50 to 120 degrees. In an embodiment, the elevation beam width is more than 5 degrees, for example, between 6 degrees and 8 degrees.

In an embodiment, the transmitted radar signals each comprise radio signals having a frequency that is between about 24 GHz and about 24.25 GHz. However, in alternative embodiments, the transmitted radar signals may each comprise radio signals having a frequency that is between about 10 GHz and about 100 GHz, particularly 20 GHz to 50 GHz.

In an embodiment, the system is configured to detect objects having a radar cross section of more than about −40 dBm$^2$. In one embodiment, the RCS is about 20 to −45 dBm$^2$, 15 to −40, 10 to −35, 5 to −30, 0 to −25, −5 to −20, or about −10 to −15 dBm$^2$. In one embodiment, the RCS is about 20, 15, 10, 5, 0, −5, −10, −15, −20, −25, −30, 40, or −45 dBm$^2$. In one embodiment, the RCS is from 20 to −40, 20 to −35, 20 to −30, 20 to −25, 20 to −20, 20 to −15, 20 to −10, 20 to −5, 20 to 0, 20 to 5, 20 to 10, or 20 to 15 dBm$^2$. In one embodiment, the RCS is from 15 to −45, 10 to −45, 5 to −45, 0 to −45, −5 to −45, −10 to −45, −15 to −45, −20 to −45, −25 to −45, −30 to −45, −35 to −45 or −40 to −45 dBm$^2$. In one embodiment, the RCS is about 20, 19, 18, 17, 16, 15, 14, 13, 12, 11, 10, 9, 8, 7, 6, 5, 4, 3, 2, 1, 0, −1, −2, −3, −4, −5, −6, −7, −8, −9, −10, −11, −12, −13, −15, −16, −17, −18, −19, −20, −21, −22, −23, −24, −25, −26, −27, −28, −29, −30, −31, −32, −33, −34, −35, −36, −37, −38, −39, −40, −41, −42, −43, −44, or −45 dBm$^2$. In one embodiment, the RCS is preferably −5 to −40 dBm$^2$, particularly, −20 to −40 dBm$^2$.

In an embodiment, the receiver(s) and transmitter(s) at each node are housed in a unit and mounted on, at, or adjacent to a perimeter fence, such that the node extends above the perimeter fence. In one embodiment, the node is mounted inside the perimeter fence with the node pointed out over the perimeter fence to monitor objects coming over the perimeter fence into the secure area. Preferably, the node is mounted 5 to 25 m inside the perimeter fence. In one embodiment, the node is mounted 10 to 20 m or 10 to 15 m inside the perimeter fence. In one embodiment, the node is mounted about 5, 10, 15, 20, or 25 m inside the perimeter fence. In one embodiment, the node is mounted 5, 6, 7, 8, 9, 10, 11, 12, 13, 14, 15, 16, 17, 18, 19, 20, 21, 22, 23, 24, or 25 m inside the perimeter. In one embodiment, the node is preferably mounted 10 to 20 m inside the perimeter.

The object detection system of any preceding claim, wherein the nodes are spaced 15 to 60 m apart. In one embodiment, the nodes are spaced at least about 55 m apart, or 50, 45, 40, 35, 30, 25, 20, or at least about 15 m apart. In one embodiment, the nodes are spaced from 20 to 55 m apart, 20 to 30 m apart, or 25 to 50 m, 30 to 45, or 25 to 40 m apart. In one embodiment, the nodes are spaced from 15 to 55 m apart, 15 to 50, 15 to 45, 15 to 40, 15 to 35, 15 to 30, 15 to 25, or 15 to 20 m apart. In one embodiment, the nodes are spaced apart from 20 to 60 m apart, 25 to 60, 30 to 60, 35 to 60, 40 to 60, 45 to 60, or 55 to 60 m apart. In one embodiment, the nodes are spaced 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 or 60 m apart. In one embodiment, the nodes are preferably spaced 30 to 50 m apart.

In one embodiment, the transceivers at a node may be arranged to form a dome, with each transmitter operating at a different frequency. In one embodiment, the frequency difference is about 15-50 KHz, 20-45, 25-40, or 30-35 KHz. In one embodiment, the frequency difference is less than about 50 KHz, or 45, 40, 35, 30, 25, 20, or about 15 KHz apart. In one embodiment, the frequency difference is from 15 to 45 KHz apart, 15 to 40, 15 to 35, 15 to 30, 15 to 25, or 15 to 20 KHz apart. In one embodiment, the frequency difference is from 20 to 50 KHz apart, 25 to 50, 30 to 50, 35 to 50, 40 to 50, or 45 to 50 KHz apart. In one embodiment, the frequency difference is 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 KHs. In one embodiment, the frequency difference is preferably 20 to 40 KHz apart.

In a second aspect, an object detection system is provided comprising plurality of nodes, each node having a transmitter configured to transmit a radar signal as a beam, and one or more receivers configured to receive a reflected radar signal; the nodes and transmitters being arranged such that the radar beam of one transmitter at least partly overlaps with the radar beam from the transmitter at an adjacent one of the nodes; the system comprising a processor configured to receive a digitised signal from each node, process the digitised signal to detect characteristics of any Doppler effects created by the movement of an object through one or more of the radar beams, compare the Doppler characteristics with Doppler signatures associated with known objects, and thereby classify the object.

The second aspect may further comprise any of the features described above in relation to the first aspect.

In a third aspect, a method for detecting moving objects is provided comprising: providing a plurality of nodes, each node having a transmitter transmitting a radar signal as a beam, and one or more receivers to sense a reflected radar signal, the transmitters being arranged such that the radar beam of one transmitter at least partly overlaps with the radar beam from the transmitter at an adjacent one of the nodes; receiving and digitising signals from the radar receivers; processing the digitised signals to detect characteristics of any Doppler effects created by the movement of an object through one or more of the radar beams; comparing the detected Doppler characteristics with Doppler signatures associated with known objects to classify the object; and triggering an alert upon the classification of the object.

The transmitters each transmit continuous wave radar signals.

In an embodiment, the transmitters each transmit constant-frequency radar signals, and wherein the signals of any two overlapping beams have different frequencies. In one embodiment, the percentage overlap is about 35-65, 40-60, or about 45-55%. In one embodiment, the percentage overlap is less than about 65%, 60, 55, 50, 45, 40, less than about 35%. In one embodiment, the percentage overlap is between 30-65, 30-60, 30-55, 30-50, 30-45, 30-40, or 30-35%. In one embodiment, the percentage overlap is 35-70, 40-70, 45-70, 50-70, 55-70, 60-70 or 65-70%. In one embodiment, the percentage overlap is about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, or 69%. In one embodiment, the percentage overlap is preferably about 40-60%, particularly about 50%.

In one embodiment, the frequency difference between two overlapping beams is about 15-50 KHz, 20-45, 25-40, or 30-35 KHz. In one embodiment, the frequency difference is less than about 50 KHz, or 45, 40, 35, 30, 25, 20, or about 15 KHz apart. In one embodiment, the frequency difference is from 15 to 45 KHz apart, 15 to 40, 15 to 35, 15 to 30, 15 to 25, or 15 to 20 KHz apart. In one embodiment, the frequency difference is from 20 to 50 KHz apart, 25 to 50, 30 to 50, 35 to 50, 40 to 50, or 45 to 50 KHz apart. In one embodiment, the frequency difference is 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 KHs. In one embodiment, the frequency difference is preferably 20 to 40 KHz apart.

In an embodiment, one or more of the nodes comprises two receivers in a "monopulse" configuration, and the step of processing the signal comprises extracting bearing information.

In an embodiment, data from each receiver is oversampled.

In an embodiment, the step of processing the signal comprises applying short-time fast Fourier transforms.

In an embodiment, the step of processing the signal comprises creating Doppler spectrograms, and the spectrograms are compared to Doppler spectrograms associated with known objects.

In an embodiment, the step of processing the signal comprises applying peak and/or track detection.

In an embodiment, the processor is a local processor and further comprising the step of sampling, filtering, and digitising the signal from each receiver at a respective node processor, and transmitting the digitised signals to the central processor.

In an embodiment, the transmitted radar signals each have a horizontal beam width of 70 to 90 degrees. In an embodiment, the elevation beam width is more than 5 degrees, for example, between 6 degrees and 8 degrees.

In an embodiment, the transmitted radar signals each have a frequency that is between about 24 GHz and about 24.25 GHz.

In an embodiment, the system is configured to detect objects having a radar cross section of more than about $-40$ $dBm^2$. In one embodiment, the RCS is about 20 to $-45$ $dBm^2$, 15 to $-40$, 10 to $-35$, 5 to $-30$, 0 to $-25$, $-5$ to $-20$, or about $-10$ to $-15$ $dBm^2$. In one embodiment, the RCS is about 20, 15, 10, 5, 0, $-5$, $-10$, $-15$, $-20$, $-25$, $-30$, 40, or $-45$ $dBm^2$. In one embodiment, the RCS is from 20 to $-40$, 20 to $-35$, 20 to $-30$, 20 to $-25$, 20 to $-20$, 20 to $-15$, 20 to $-10$, 20 to $-5$, 20 to 0, 20 to 5, 20 to 10, or 20 to 15 $dBm^2$. In one embodiment, the RCS is from 15 to $-45$, 10 to $-45$, 5 to $-45$, 0 to $-45$, $-5$ to $-45$, $-10$ to $-45$, $-15$ to $-45$, $-20$ to $-45$, $-25$ to $-45$, $-30$ to $-45$, $-35$ to $-45$ or $-40$ to $-45$ $dBm^2$. In one embodiment, the RCS is about 20, 19, 18, 17, 16, 15, 14, 13, 12, 11, 10, 9, 8, 7, 6, 5, 4, 3, 2, 1, 0, $-1$, $-2$, $-3$, $-4$, $-5$, $-6$, $-7$, $-8$, $-9$, $-10$, $-11$, $-12$, $-13$, $-15$, $-16$, $-17$, $-18$, $-19$, $-20$, $-21$, $-22$, $-23$, $-24$, $-25$, $-26$, $-27$, $-28$, $-29$, $-30$, $-31$, $-32$, $-33$, $-34$, $-35$, $-36$, $-37$, $-38$, $-39$, $-40$, $-41$, $-42$, $-43$, $-44$, or $-45$ $dBm^2$. In one embodiment, the RCS is preferably $-5$ to $-40$ $dBm^2$, particularly, $-20$ to $-40$ $dBm^2$.

The system may further comprise comparing the detected Doppler characteristics with known Doppler signatures associated with known objects not of interest; and, in the case that the characteristics do not correlate to one such known object, triggering the alert.

The system may further comprise comparing the detected Doppler characteristics with known Doppler signatures associated with known objects of interest; and, in the case that the characteristics correlate to one such known object, triggering the alert.

The system may further comprise training the processor to recognise known objects using machine learning. In one example, the machine learning may comprise neural network techniques, for example, a convolutional or recurrent neural network. Neural networks are one exemplary approach that may be used to train the processor. Alternatively, other machine learning techniques or approaches may also be applied to train the processor to recognise known objects such as for example back propagation, linear regression, logistic regression, support vector machines or any other suitable machine learning techniques or approaches.

The term 'comprising' as used in this specification and claims means 'consisting at least in part of'. When interpreting statements in this specification and claims which include the term 'comprising', other features besides the features prefaced by this term in each statement can also be present. Related terms such as 'comprise' and 'comprised' are to be interpreted in a similar manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

This disclosure may also be said broadly to consist in the parts, elements and features referred to or indicated in the specification of the application, individually or collectively, and any or all combinations of any two or more said parts, elements or features, and where specific integers are mentioned herein which have known equivalents in the art to which this disclosure relates, such known equivalents are deemed to be incorporated herein as if individually set forth. Optional features and embodiments discussed above may be applied to each of the first aspect, the second aspect and/or the third aspect.

As used herein the term '(s)' following a noun means the plural and/or singular form of that noun.

As used herein the term 'and/or' means 'and' or 'or', or where the context allows both.

The disclosure also envisages constructions of which the following gives examples only.

BRIEF DESCRIPTION OF THE DRAWINGS

The present disclosure will now be described by way of example only and with reference to the accompanying drawings in which:

FIG. 4B shows the receiver detection zone for each node;

FIG. 4C shows the form of the transmitted radar beam;

FIG. 5 shows an example of two antennas and a radar beam extending therefrom defining the detection envelope;

DETAILED DESCRIPTION OF A PREFERRED EMBODIMENT

FIGS. 1 to 8 show an exemplary embodiment object detection system 100 and method according to one embodiment. The object detection system 100 may be used for detecting objects that are thrown into a secured area such as, for example, a correctional facility.

Figure 1:
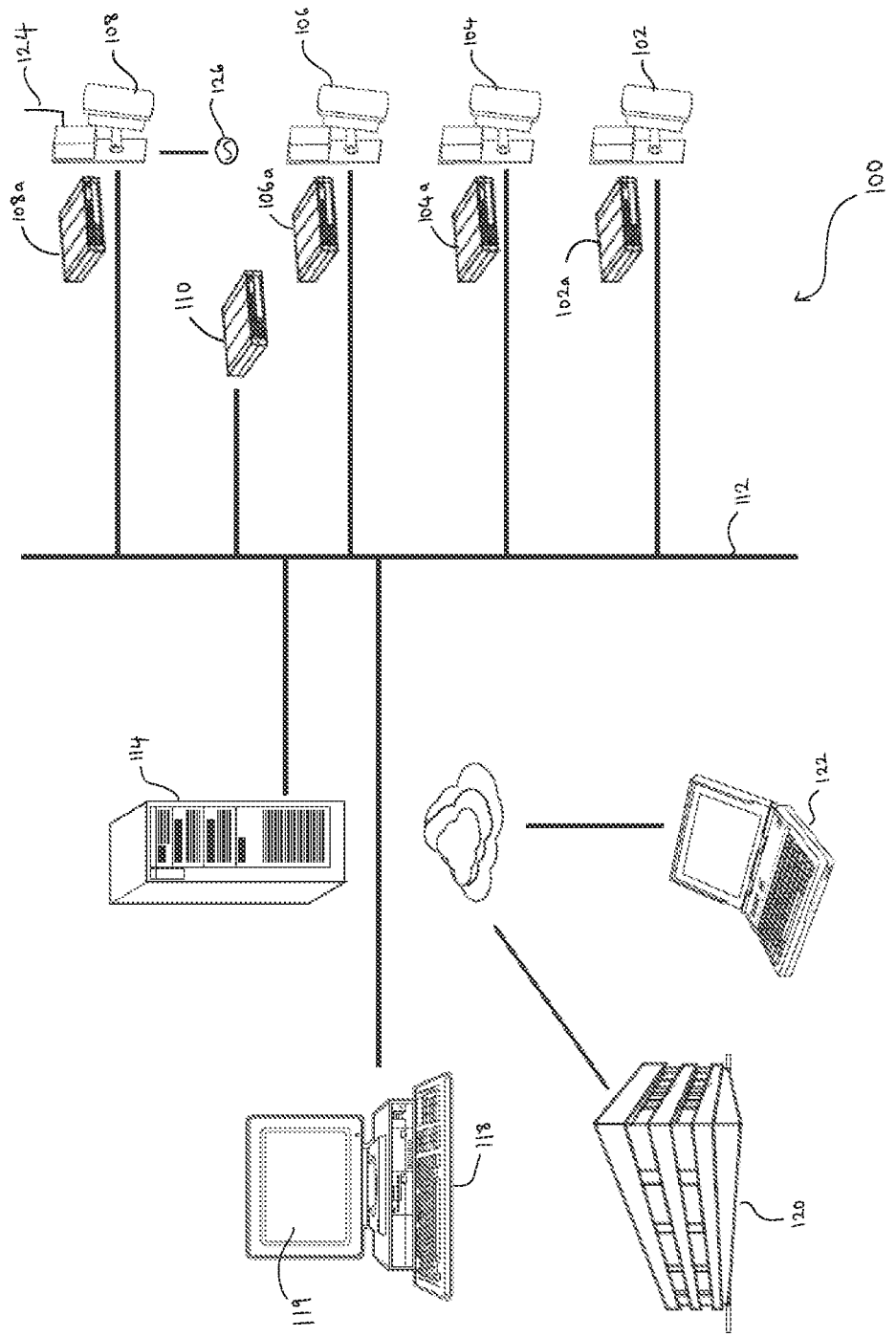
FIG. 1 shows a schematic diagram of an object detection system.

Referring to FIG. 1, the object detection system 100 comprises a plurality of nodes 102, 104, 106, 108. The object detection system 100 in the schematic of FIG. 1 shows four nodes 102, 104, 106 and 108 (102-108), but the system may have many more than or fewer than four nodes or may only have a single node for small scale simple applications. The number of nodes used as part of the system is dependent on the size of the secured area or the shape of the perimeter fence or both. In the embodiment shown, the nodes are spaced 15 to 30 m apart. However, in alternative embodiments, the nodes may be spaced up to 60 m apart. In still further alternative embodiments, the nodes may be spaced up to 100 m apart with changes to the antennas, for example by the addition of one or more IQ vector modulators and/or reflected power cancellers (RPC). In one example, a pair of IQ vector modulators may be used to allow for a node spacing of up to 100 m. In one example, one or more RPCs may be used to reduce phase noise leakage and may allow for longer detection ranges. It will be appreciated that the spacing between nodes may increase further subject to additional improvements to antenna technology allowing for greater ranges of signal transmission with minimal signal loss or noise.

Figure 9:
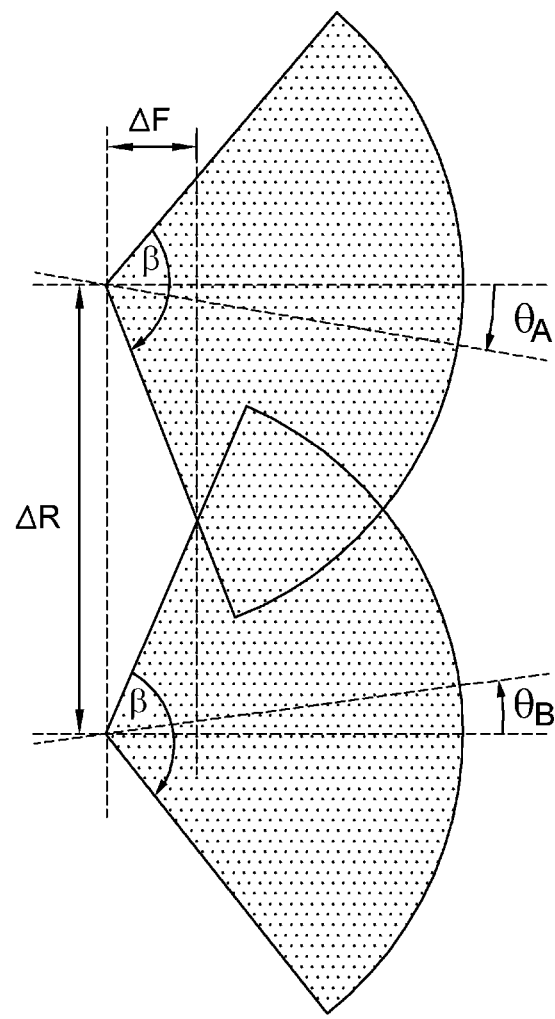
FIG. 9 is a schematic showing bean angles for calculating node spacing.

The spacing of the nodes depends on the characteristics of the transmitted beam and can be calculated, with reference to FIG. 9:

$$\Delta R = \Delta P[\tan(\beta/2 + \theta_A) + \tan(\beta/2 + \theta_B)]$$

In which:

$\Delta R$ is the separation between radar nodes;

$\Delta F$ is the horizontal separation between radar node and perimeter;

$\beta$ is the transmitter azimuth beamwidth (defined by the half-power/−3 dB points);

$\theta_A$ is the azimuth angle between radar node A boresight and perpendicular-line to perimeter; and $\theta_B$ is the azimuth angle between radar node B boresight and perpendicular-line to perimeter.

This calculation assumes the radar nodes are placed equidistant from the perimeter, i.e. inner fence, at an equal height (relative to one another and the fence), and that the radar nodes have equal elevation angle, and beamwidth (in azimuth and elevation).

Each node 102-108 includes an antenna assembly (FIG. 3C) having a transmitter 320 configured to transmit a radar signal as a beam 400 (FIG. 4) and at least one receiver 322, 324 configured to receive a reflected signal. The transmitter and receiver(s) preferably each comprise an antenna 320, 322, 324 provided at each respective node 102-108.

Each node is supplied by a power supply 126. Only one power supply is shown in FIG. 1 for clarity. The power supply 126 may be a grid connection, a connection to a local power source such as an onsite generator, or a power source at the node itself, for example photovoltaic cells. Further, each node 102-108 further includes one or more input/output (I/O) 124 ports or I/O features. The I/O features or ports 124 allow a user to read or write information from a node to, for example, modify operating parameters of the node.

With continued reference to FIG. 1, the object detection system 100 comprises a central processor 114 and preferably one or more local processors 110. Preferably each node 102-108 comprises a node processor 102a, 104a, 106a, 108a. Each node processor 102a, 104a, 106a, 108a is arranged in electrical communication with the respective receiver(s) at that node. Alternatively, the object detection system 100 may include a single node processor that is arranged in electrical communication with all the nodes 102-108. In such an embodiment, the node processor 110 may include a multiplexer and multiple channels to sample signals from each node. The node processors preferably digitise the signal from the respective receiver(s) for transmitting to a local processor 110. Alternatively, each radar node may comprise an ADC (analog to digital converter) that is configured to digitise the received signal before being passed to the local processor.

The local processor 110 is a server or a computing device that is arranged in communication with all or a subset of the local processors 102a, 104a, 106a, 108a, and/or nodes 102, 104, 106, 108 in the system 100. The system 100 may comprise multiple local processors 110, each for processing data from a subset of nodes. The local processor 110 is interconnected to the node processors 102a, 104a, 106a, 108a through a local connection 112, and also to a central processor 114. The local connection 112 may be a LAN network or a wireless LAN network. In one example, the local connection 112 is an Ethernet LAN network or alternatively the local connection 112 is a Wi-Fi network. Alternatively, the node processor(s) 102a, 104a, 106a, 108a may be electrically coupled to the local processor 110 via a wired connection for example using a serial or parallel bus connection.

Preferably all the nodes are time synchronised using any appropriate method—wired or wireless. This enables data to be processed remote from the nodes, for example, remotely on the site subject to monitoring, or remotely off-site.

Upon digitising the receiver signals, the node processors 102a, 104a, 106a, 108a may process the digitised signal to detect characteristics of any Doppler effects created by the movement of an object through the respective radar beam at the node. Alternatively, this processing may be carried out in full or part by the or each local processor 110. The local processor 110 is configured to receive a digitised signal from each node processor 102a, 104a, 106a, 108a.

Figure 2:
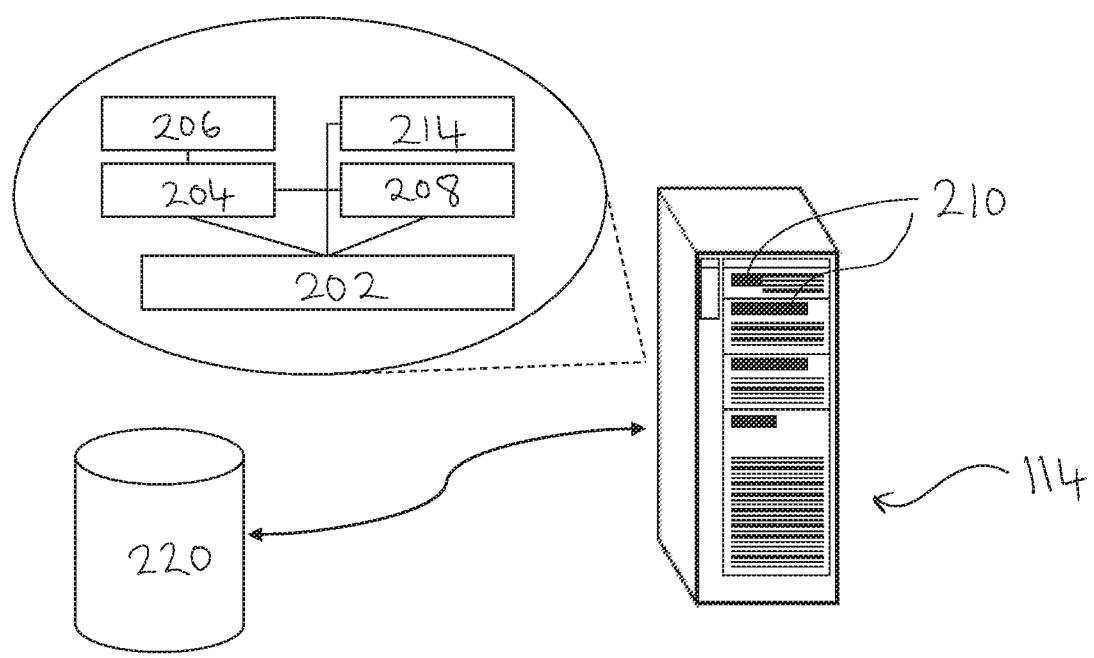
FIG. 2 shows an exemplary embodiment of the central processor that is used as part of the object detection system of FIG. 1.

FIG. 2 shows an exemplary embodiment of the central processor 114. The central processor 114 contains an Application Program Interface (API) to facilitate the communication of data from the node processors 102a, 104a, 106a, 108a and local processor 110 to a user interface 118. Referring to FIG. 2, the central processor 114 comprises a processing unit 202, read-only memory ROM 204, random access memory RAM 206, input/output devices such as disk drives 208, input devices 210, such as, for example an Ethernet port, a USB port etc. The central processor 114 includes instructions that may be stored in ROM 204, RAM 206 or disk drives 208 and may be executed by the processing unit 202. There may be provided additional communications links 214, which may variously connect to one or more computing devices, such as a server, personal computers, terminals, wireless or handheld computing devices. The central processor 114 may also have a suitable operating system which resides on the disk drive 208 or in ROM 204 of the central processor 114. The server may include a database 220 residing on a disk or other storage device, which may be arranged to store one or more data elements or sets of data such as, for example, a training data set or other data relating that can be used in filtering the signals from the nodes 102-108 or object identification by the central processor 114. The database 220 may also store Doppler characteristics or signatures relating to known objects i.e. objects not of interest. Alternatively, this data may be stored on the local processor(s) 110 or the node processors 102a, 104a, 106a, 108a.

The object detection system 100 preferably further comprises a local computer 118 that is configured to display a GUI (i.e. graphical user interface). The local computer 118 includes at least a processor and memory unit (not shown) and a screen 119. The GUI is displayed on the screen 119. The GUI is preferably used to display a notification or other information if an object is detected by the object detection system 110 based on the detection of characteristics of any Doppler effects created by the movement of the object through the radar beams emitted by the nodes 102-108. For example, the GUI may display information about the location of the object, its trajectory, and/or the nature of the object. The local computer 118 may alternatively be a mobile device such as a smartphone or tablet associated with a person. For example, the GUI can be displayed on mobile devices of each guard in the prison complex such that if an object is detected all the guards are presented with an alert or alarm on their mobile devices. The local computer 118 is also preferably part of the LAN network and is arranged in a client server relationship with the central processor 114. The local computer 118 functions as a client and the central processor 114 functions as a server.

As shown in FIG. 1, the system may comprise additional sites 120 and remote computing devices 122. The additional sites 120 and the remote computing devices 122 are preferably remote from the secured site that includes the object detection system 100. Examples of additional site may be one or more local police stations that are configured to receive a notification or message if an object is detected by the system 100; an external security agency or team that may then conduct a check of the perimeter external to the secured area; or a remote monitoring station that may be in communication with police or other law enforcement authorities. Remote computing devices 122 may be, for example, mobile devices or computing devices associated with one or more persons outside or remote to the secured site. The additional sites 120 and the remote computing devices 122 are connected to at least the central processor 114 via a wide area network (WAN) 116, which may also integrate into law enforcement or external security systems. The additional sites 120 and the remote computing devices 122 may also, optionally, be configured to communicate directly with the nodes 102-108.

Figure 3A:
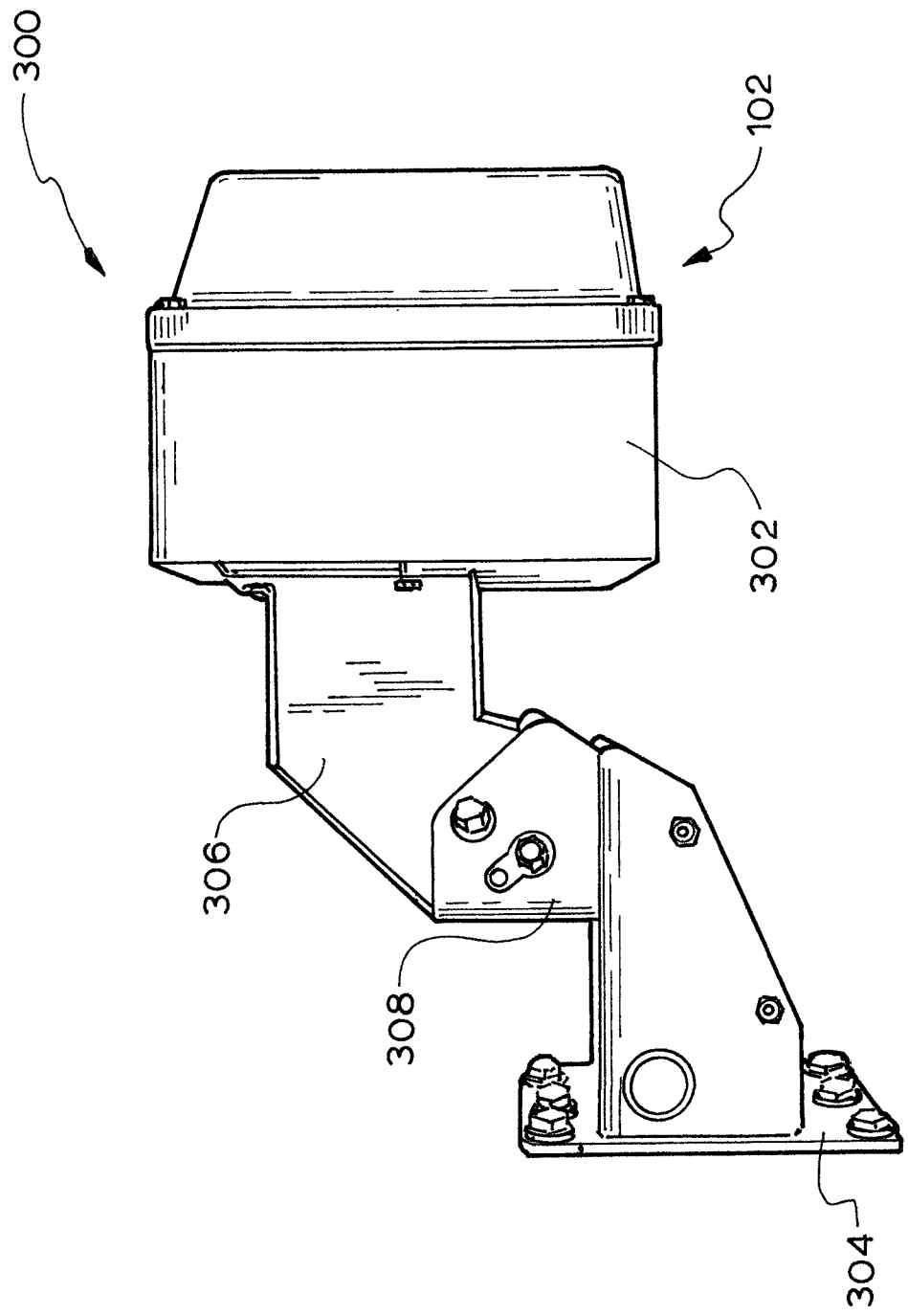
FIG. 3A shows an embodiment of one node, of the object detection system, including an antenna assembly and housing.
Figure 3B:
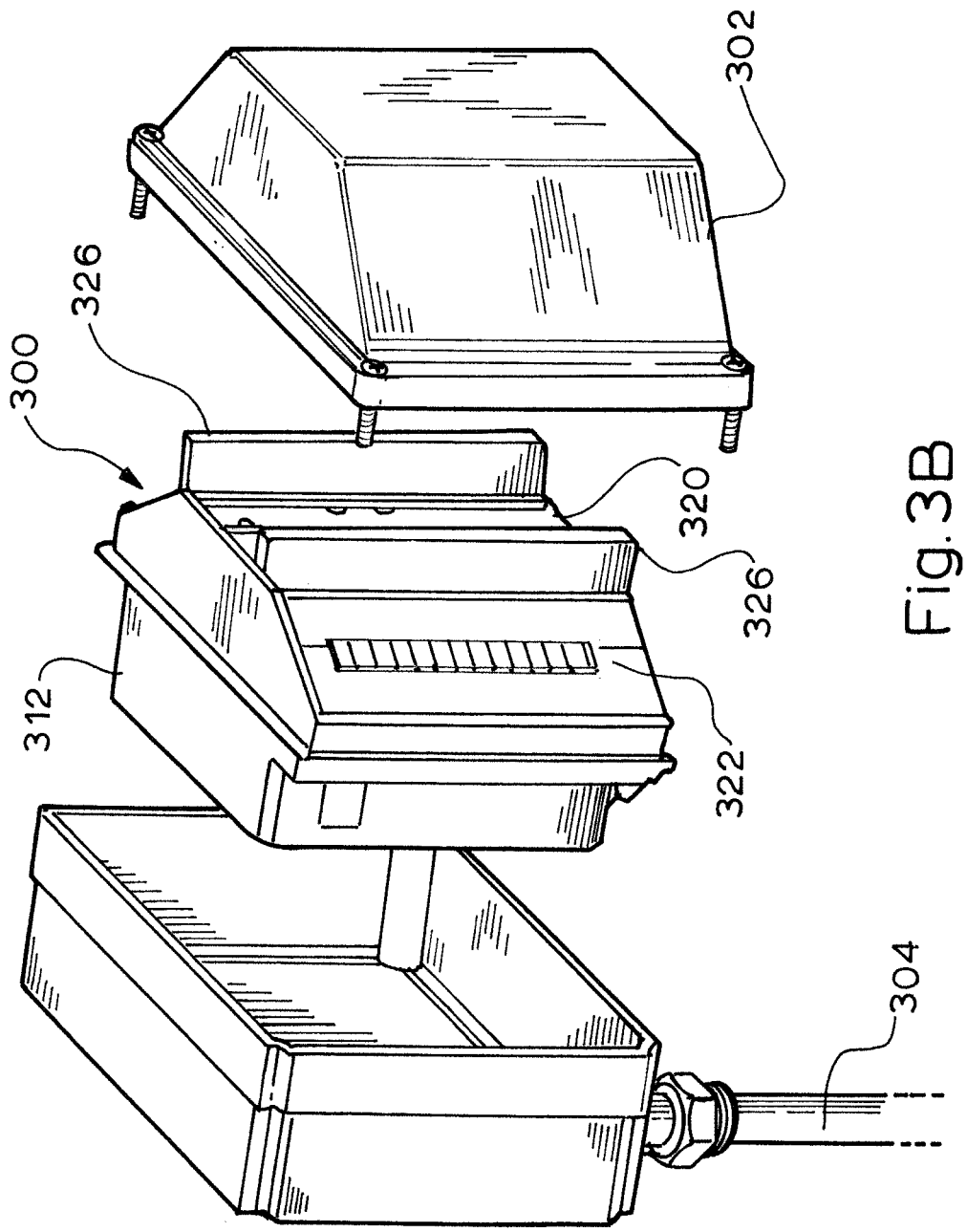
FIG. 3B is an exploded perspective view of the antenna assembly of FIG. 3B
Figure 3C:
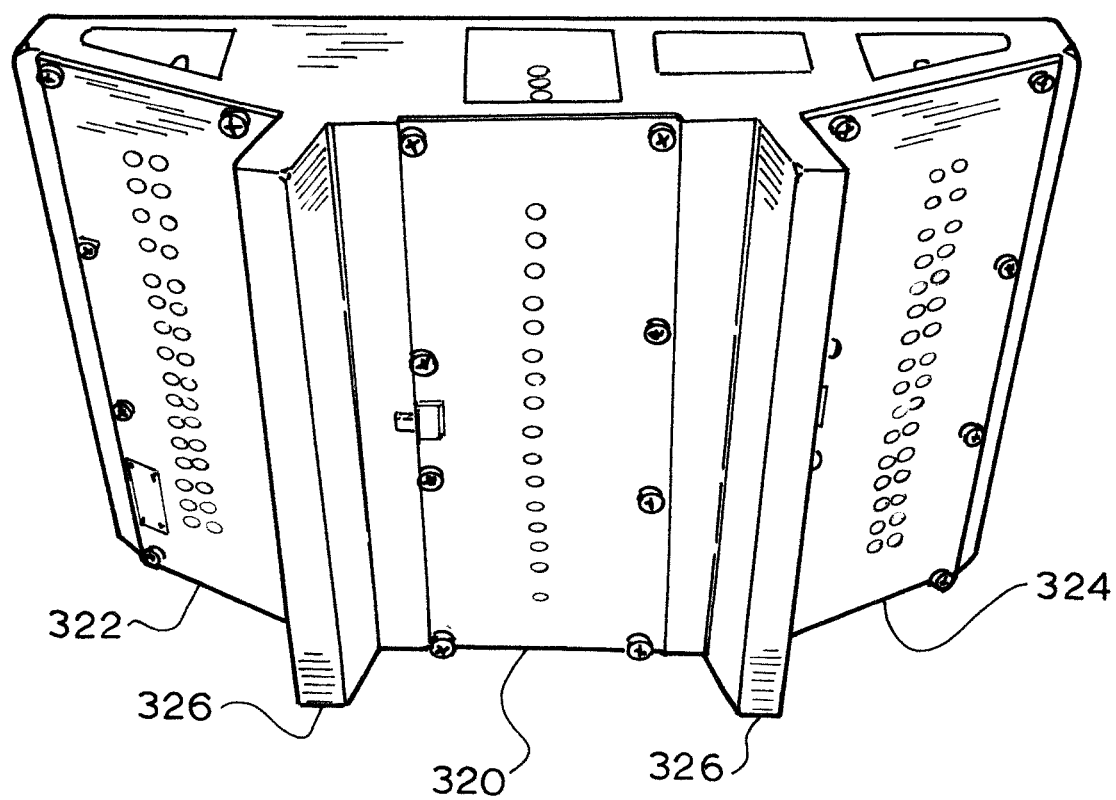
FIG. 3C is a front overhead perspective view showing the antenna arrangement in the embodiment shown in FIGS. 3A and 3B.

FIG. 3 shows an embodiment of one node 102. The other nodes in the system also comprise a similar structure. Referring to FIGS. 3B and 3C, the node 102 comprises a transmitter and a receiver arrangement 300 located in a casing 302. The casing 302 is a hollow housing that retains and protects the one or more antennas 300 at the node i.e. a transmitter antenna 320 and two receiver antennas 322, 324. The transmitter and receiver antennas can be positioned in any suitable configuration within the housing. The front portion of the housing through which the radars are directed comprises a radome, which is transparent to the transmitted radar signal. Preferably the Radome is constructed from a material that is thin enough to prevent unwanted attenuation of the radar signal while providing suitable protection of the antennas from environmental conditions. For example, the radome may be formed from plastics or composite materials such as fibreglass. Chopped strand fiberglass is more preferable than fiberglass mats as chopped strand fiberglass has less effect on the polarisation of signals. The housing may comprise any suitable material, for example a metal, plastic, or composite material.

The antennas 320, 322, 324 are preferably micro strip antennas fabricated using micro strip etching techniques on a printed circuit board. Each node acts as a complete radar wherein the transmitter is configured to transmit a radar signal as a beam and the receiver(s) is/are configured to receive a reflected radar signal. A septum or divider 326 isolates the transmitter from the receivers to minimise leakage. The nodes preferably each comprise a pair of receivers arranged in a "monopulse" configuration to provide a measurement of bearing to each detected target. This configuration refers to the antenna beam patterns and does not require that the radar be pulsed. The system 100 may comprise some nodes, for example end nodes, 102, 108 with only a single receiver, while other nodes 104, 106 may comprise a pair of receivers (see also FIG. 4).

The node 102 further comprises a mounting member 304 configured to mount the node 102 at or near a perimeter fence (i.e. barrier) that defines a secured area, or on a structure such as a pole adjacent to or spaced from the perimeter. The transmitters may direct the radar beams inwardly or outwardly. For example, the nodes may be mounted on the perimeter fence with the node pointed into the secure area to monitor objects going out of the secure area. Alternatively, the node may be mounted on the perimeter fence with the node pointed out of the secure area to monitor objects going out of the secure area. As a further alternative, the node may be mounted on the perimeter fence to monitor objects coming up to or adjacent the perimeter fence. In one embodiment, the node is mounted on a pole or building and is pointed outside of the secure area to monitor a virtual perimeter.

The mounting member 304 in the embodiment shown is a plate as shown in FIG. 3 but may alternatively may comprise any suitable attachment, for example a bracket. The node 102 may be mounted to the perimeter fence or other structure in any suitable manner e.g. by bolting, clipping, or clamping etc. An arm 306 movably couples the antenna casing 302 to the mounting plate 304 via a joint 308. The joint 308 may be any suitable joint such as a ball and socket joint or a pivot or any other suitable joint that allows movement of the housing 302 and thus movement of the transmitter and receiver arrangement relative to the mounting member 304 to adjust the position or orientation of the directed beam, for example, in response to environmental conditions or to operate in different modes. For example, if fitted to the perimeter and angled to the ground, a node could detect someone approaching or an object, such as an IED, thrown at the perimeter. This movement of the casing and antenna assembly may be motorised and may be configured to be operated remotely. Preferably the joint 308 is a joint 308 that allows omnidirectional movement of the transmitter and receiver arrangement.

The system 100 is a modular system that allows for nodes to be added, removed, or modified, for example with different antennas. The radome of the casing 302 is removably coupled to the rest of the casing thereby allowing the antenna assembly 300 and/or the controller or electronics to be replaced, for example, to retrofit antennas with different beam patterns.

In the embodiment shown, the casing 032 also acts as an electronics housing that retains the respective node processor and a controller 312. The controller 312 is configured to control the operation of the transmitter and/or the receiver(s) of a node. The controller 312 comprises suitable circuitry to control the transmitter and/or the receiver(s). For example, the controller 312 may comprise interfacing circuitry, power smoothing circuitry, safety circuitry such as over current or over voltage and other control circuitry necessary to control operation of the transmitter and/or receiver. In some forms the controller 312 may also comprise local memory to at least temporarily store control parameters or store readings from the receiver.

Figure 4:
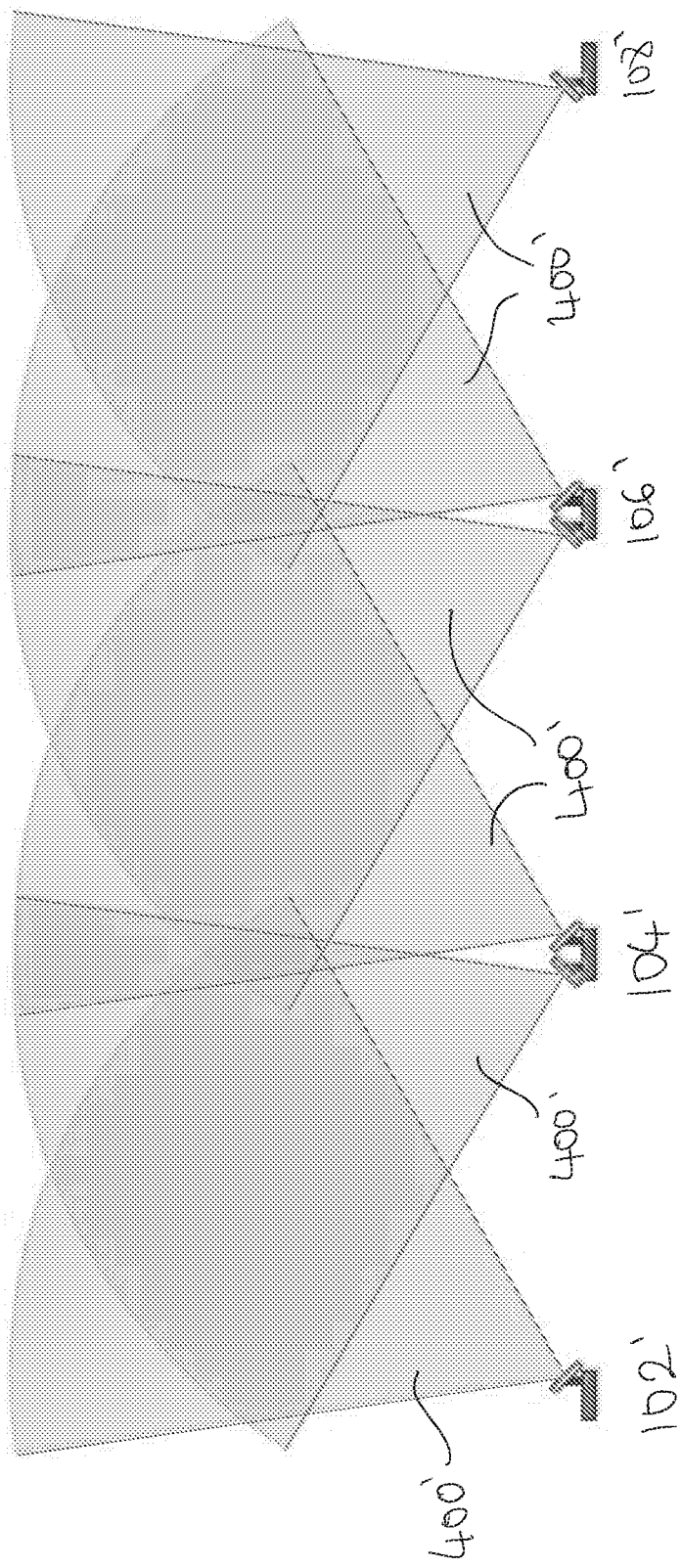
FIG. 4 shows an exemplary arrangement of nodes that creates a detection blanket.

FIG. 4 shows an exemplary arrangement of the nodes 102-106 being mounted along a straight line, for example, along a straight section of a perimeter fence of a secured area. At each node 102-108, adjacent transmitter and receivers are closely spaced from each other and separated by a septum to minimise leakage from the transmitter to the receiver, thereby avoiding any maximum transit power restriction and minimising the effective phase noise being coupled across to the receiver. Further the transmitter and receiver antennas are angled relative to each other to reduce leakage. For example, the receiver antennas are both angled relative to the transmitter antenna to minimise leakage from the transmitter to the receivers. Each antenna (transmitter or receiver) is also optimised in size and layout to reduce sidelobe levels.

The nodes 102-108 are spaced adjacent each other and the transmitters orientated and configured to ensure that the radar beams 400 of transmitters on adjacent nodes at least partly overlap, the spacing of the nodes and their operational frequency being optimised for "monopulse" beam formation and minimal leakage. The percentage overlap of transmitted beams at adjacent nodes is preferably between 30-70%. The nodes 102-108 may be arranged such that there is at least partial overlap between the radar beams of three adjacent nodes. In the illustrated example nodes 102 and 104 are arranged close together such that a substantial portion of the radar beam 400 from the transmitter of node 102 and the radar beam 400 of the transmitter of node 104 overlap each other. The radar beam 400 from the transmitter of node 102 also overlaps with the radar beam from node 106. The nodes 102-108 are arranged such that a detection 'blanket' is created by the overlapping radar beams. FIG. 4 shows an exemplary arrangement of nodes that creates a detection blanket.

Embodiments of the present disclosure may detect an object based on processing radar signals received from adjacent receivers and as an object travels through two or more partly overlapping beams. Transmitted radar beams at adjacent nodes may be angled relative to each other such that at least the radial components of the beam are non-parallel to each other. The angle of the antennas on adjacent nodes may be such that the radial component of the radar beams from adjacent nodes is less than 90 degrees but preferably greater than 0 degrees to ensure that an object moving in an unfavourable direction in relation to one node will be detected more strongly by the adjacent node.

Figure 4A:
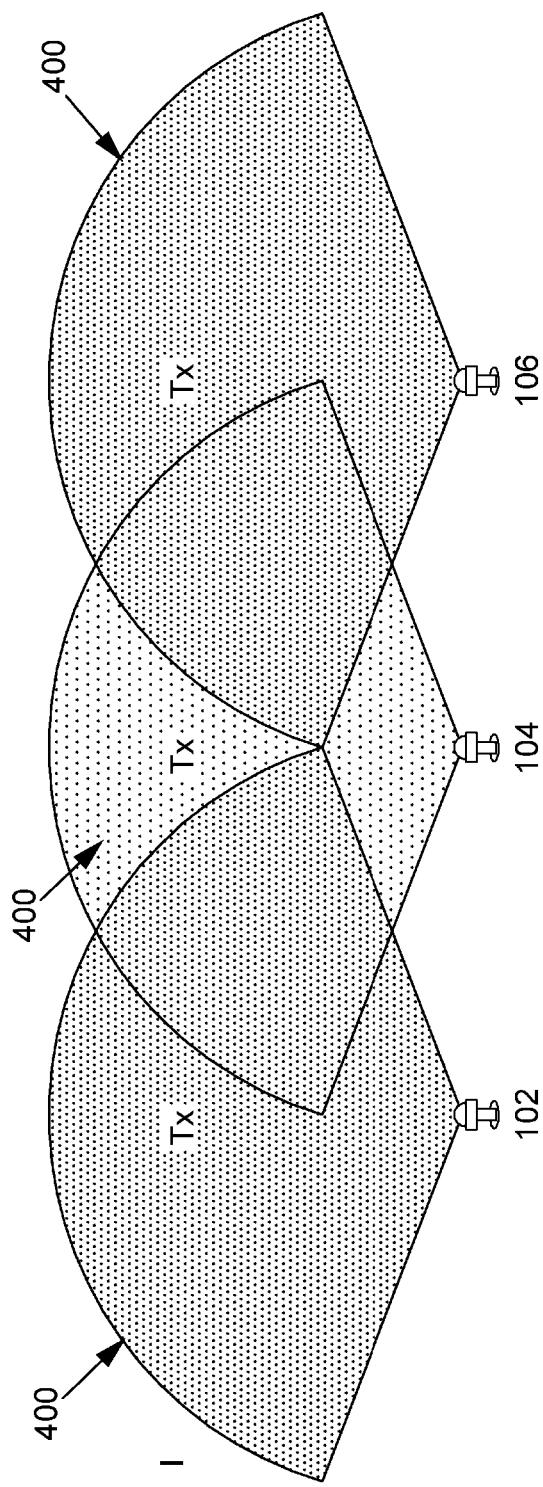
FIG. 4A shows a further exemplary arrangement of nodes that creates a detection blanket.

The transmitted radar beams 400 from each antenna 300 extend outwardly from the nodes to define a detection envelope 400 that is substantially cone or fan shaped beam as shown in FIG. 4A. The lobe of each transmitter radar beam TX is substantially conical or fan shaped as shown in FIG. 4C. Each node provides a 15 m to 30 m radius detection envelope 400. However, in alternative embodiments the envelope may be up to 60 m, the range will depend on the size of the target and the specifications of the transmitters and receivers.

The two receivers at each node each monitor an area RX1, RX2 that is at least half of the transmitted beam area, as shown in FIG. 4B. The detection envelope of 15 m to 60 m means that at least a single node with a single antenna 300 is required every 15 m to 60 m in order to gain maximum coverage and reduce blind sports. The detection envelope extending between 15 m and 50 m is useful for complex, twisting topologies of perimeter fences. The extent of the detection envelope is dependent on environmental features such as for example overhanging trees etc. These environmental features can limit the extent of the detection envelope 400. The receivers may be arranged such that the beam patterns of the two adjacent receivers RX1 and RX2 overlap between 25% and 75%, more particularly overlap between 40% and 60% and preferably overlap by about 50%.

Each node is mounted on a structure or on a perimeter fence. In one embodiment, each node and hence each antenna is mounted above the perimeter fence of a secured area. Preferably each node is installed such that it is located between 1 m and 3 m above a perimeter fence, thereby ensuring the antenna (transmitter and receiver) are also located between 1 m and 3 m above a perimeter fence of a secured area. More preferably each node is mounted around 2 m above the perimeter fence of a secured area. Each node is mounted such that each antenna faces outwardly. However, in alternative installations the nodes may face inwards or point upwards from the perimeter. In alternative embodiments, each node and hence each antenna is mounted spaced from a physical perimeter, for example, inside or outside a perimeter fence.

Figure 6:
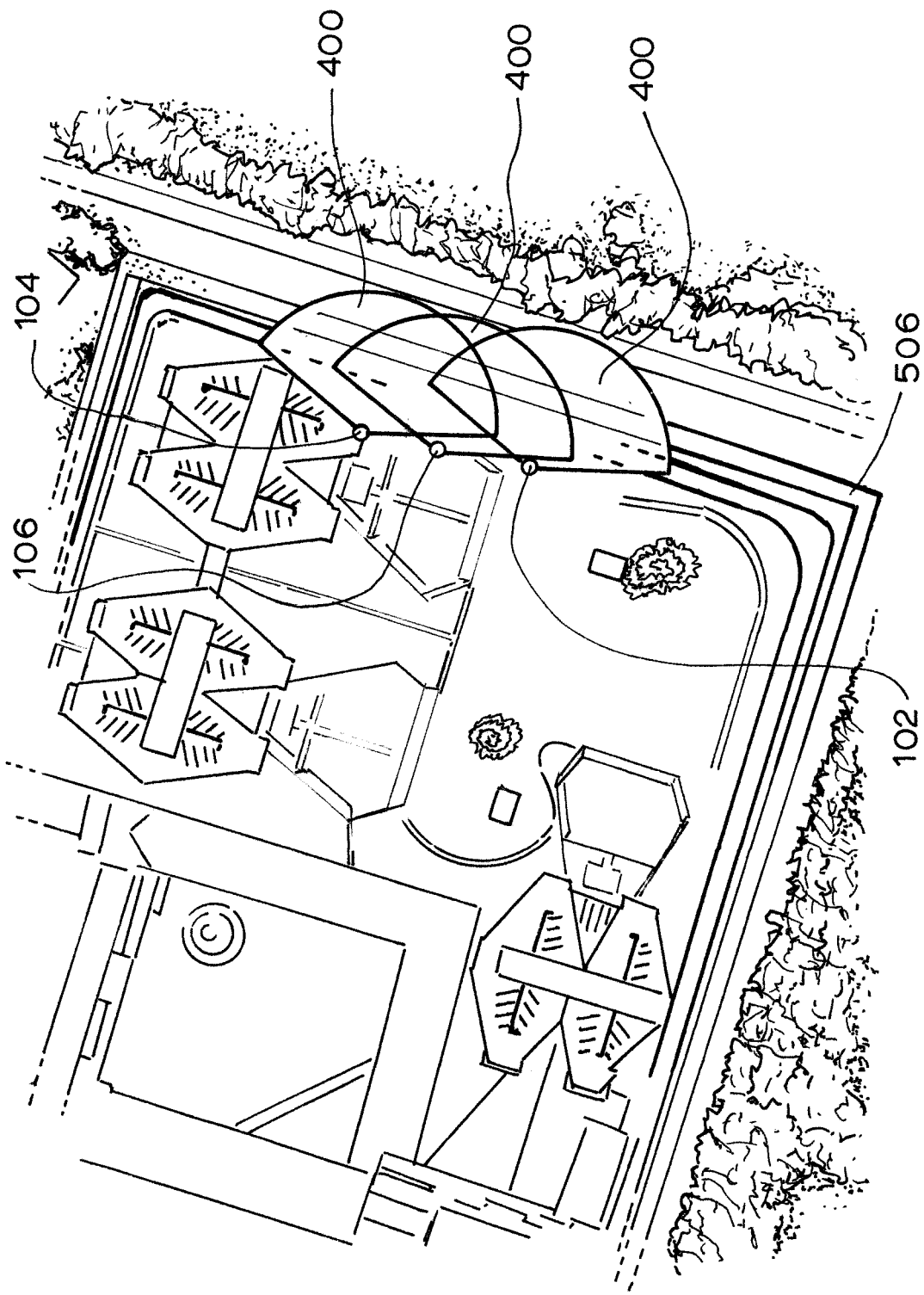
FIG. 6 shows a plan view of a secured area with three nodes mounted near a perimeter fence.

FIG. 6 shows a plan view of a secured area with showing the detection zone for three nodes 102, 104, 106 mounted near a perimeter fence 506 as to monitor the perimeter fence. The nodes are mounted such that the antennas face outward with the radar beams 400 transmitting in a direction Each transmitter in the system 100 is preferably generates a beam with a directional elevation i.e. elevation beam width of at least 5 degrees but more preferably between 6 degrees and 8 degrees and a horizontal i.e. azimuth beam width between 50 degrees and 120 degrees. More preferably the horizontal i.e. azimuth beam width is between 90 degrees and 110 degrees. The wide azimuth beam width results in a low gain system and allows the system to transmit and receive simultaneously from two adjacent antennas. The azimuth beamwidth of the receivers in a node having only a single receiver is similarly between 50 degrees and 120 degrees, and preferably 90-110 degrees. The azimuth beamwidth of each receiver in a dual-receiver node is 60-70 degrees, with a 50% overlap between beams measured at the −3 dB point. The elevation beam width and the azimuth beam width define the detection envelope 400 and define the region where the radar beam extends FIG. 5 shows an example of two antennas 300 and a radar beam 500 extending therefrom defining the detection envelope 400. FIG. 5 shows two antennas (and hence two nodes) being mounted near a perimeter fence 506. As can be seen from FIG. 5 the elevation beamwidth 502 is between 6 and 8 degrees. The azimuth or horizontal beamwidth 504 is between 70 and 90 degrees. FIG. 5 shows how the radar beams 500 extend from the mounted location of the antenna and extend over other static structures such as two fences 508, 510.

The transmitter antenna 320 of each node comprises a 24 GHz automotive chipset. The chipset generates the radar beam from the transmitter within the 24 GHz ISM band with a frequency between 24 GHz and 24.25 GHz. The transmitter preferably generates radio signals but may generate microwave signals or another suitable type of signal. Use of 24 GHz ISM band frequency is advantageous this frequency band is available licence-free. The antenna is built, for example, using components rated at least to the industrial temperature grade of between −40 degrees Celsius to 75 degrees Celsius, or the alternative industrial temperature grade of −40 degrees Celsius to 85 degrees Celsius.

The transmitters each transmit radar signals in the form of continuous wave radar signals. The transmitted radar signals are also preferably constant frequency radar signals, and wherein the signals for any two overlapping beams have different frequencies to reduce inter-antenna interference when there are a plurality of antennas being operated concurrently. The frequency difference may be within 10 kHz to accommodate a large number of nodes, but alternatively may be larger, for example, 15-50 kHz. Preferably the antenna at each node transmits a continuous, constant frequency signal and adjacent antennas transmit signals of different frequencies.

Since the radar signals are constant frequency transmissions no range information is determined by the node or local processors 110. The object detection system 100 is configured to detect an object that has entered the radar beam by detecting characteristics of any Doppler effects created by movement of the object through one or more radar beams and comparing the Doppler characteristics with Doppler characteristics or signatures associated with known objects. Doppler characteristics relate to a change in frequency of the transmitted radar beam (i.e. the transmitted radio signal) that is caused due to the Doppler effect of an object moving through the radar beam. The signal reflected off the object will have a different frequency to the transmitted signal as a result of this motion.

Moving objects are detected from their relative radial Doppler spectra. In particular, as the object moves through two or more overlapping radar beams, the object is detected based on the relative radial Doppler spectra detected at each receiver located at each node that transmitted the radar beam. Static objects such as for example ground clutter, buildings, fences etc. are automatically filtered out because a receiver does not detect a radial Doppler spectral component. The component of movement of an object toward or away from the antenna will appear as an offset frequency signal. Variations in this signal over time arise from the trajectory of the object as it moves through the radar beam and from micro Doppler effects caused by movement of the object itself (for example, spinning or flapping).

The Doppler spectra received at each receiver of each node will vary depending on the trajectory of the object, allowing the trajectory to be inferred by comparing the different Doppler spectra. Combining the various detected Doppler spectra and the bearing information from multiple nodes, individual objects can be detected including their trajectory (range and bearing only). Each moving target will have a characteristic Doppler frequency (at each node) linearly dependent on its instantaneous radial velocity towards that node. Changes in measured radial velocity over time can be combined with monopulse-derived horizontal-bearing information and radar system geometry to triangulate the speed and trajectory of each target. For example, tennis balls may be identified by their ballistic trajectories and other targets discriminated. Using detected Doppler spectra objects can be detected and classified. The central processor 114 is configured to detect an object by performing the above listed functions.

Figure 7:
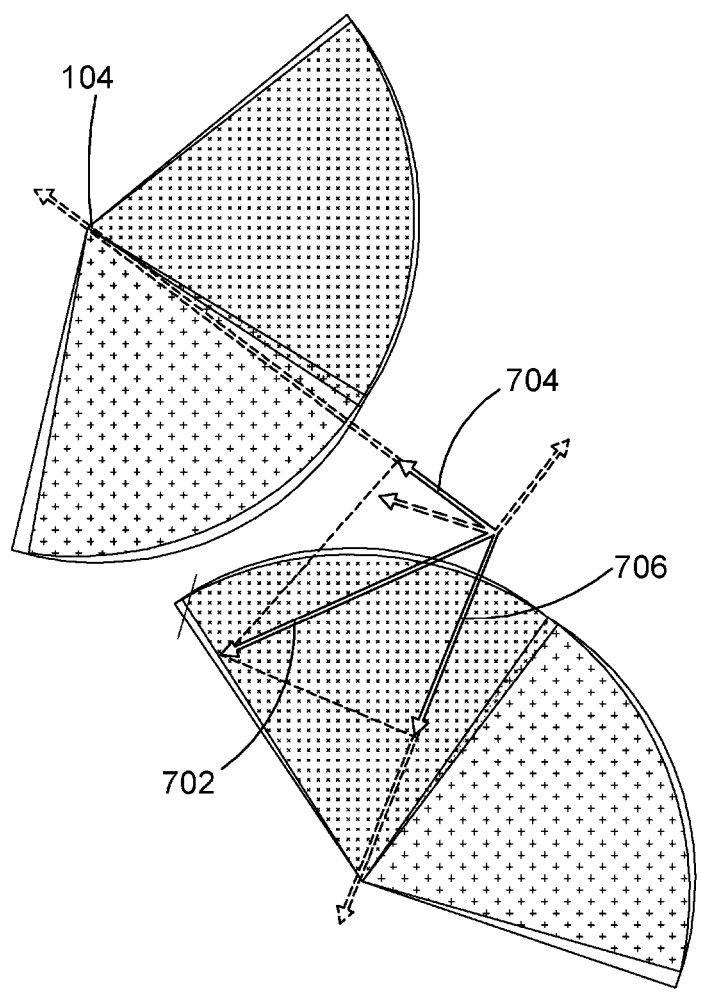
FIG. 7 shows an example of an object moving through two radar beams.

FIG. 7 shows an example of an object moving through two radar beams. The object 700 is moving at a constant velocity between two adjacent nodes 102 and 104. The velocity vector of the object is denoted by 702. Arrows 704 and 706 represent the relative radial Doppler velocity toward each node 102, 104 respectively. The Doppler velocity is proportional to the Doppler offset frequency measured by the receivers. The radial velocity component and bearing changes in a detectable manner to allow detection of the object based on Doppler characteristics. The angling of receivers at adjacent nodes towards each other ensures a radial component of an object's trajectory will be present with respect to one of the nodes for any non-vertical movement through two overlapping beams. The central processor 114 is configured to detect an object based on detecting characteristics of any Doppler effects created by the movement of the object through one or more of the radar beams, comparing the detected Doppler characteristics with Doppler signatures associated with known objects to classify objects.

Figure 8:
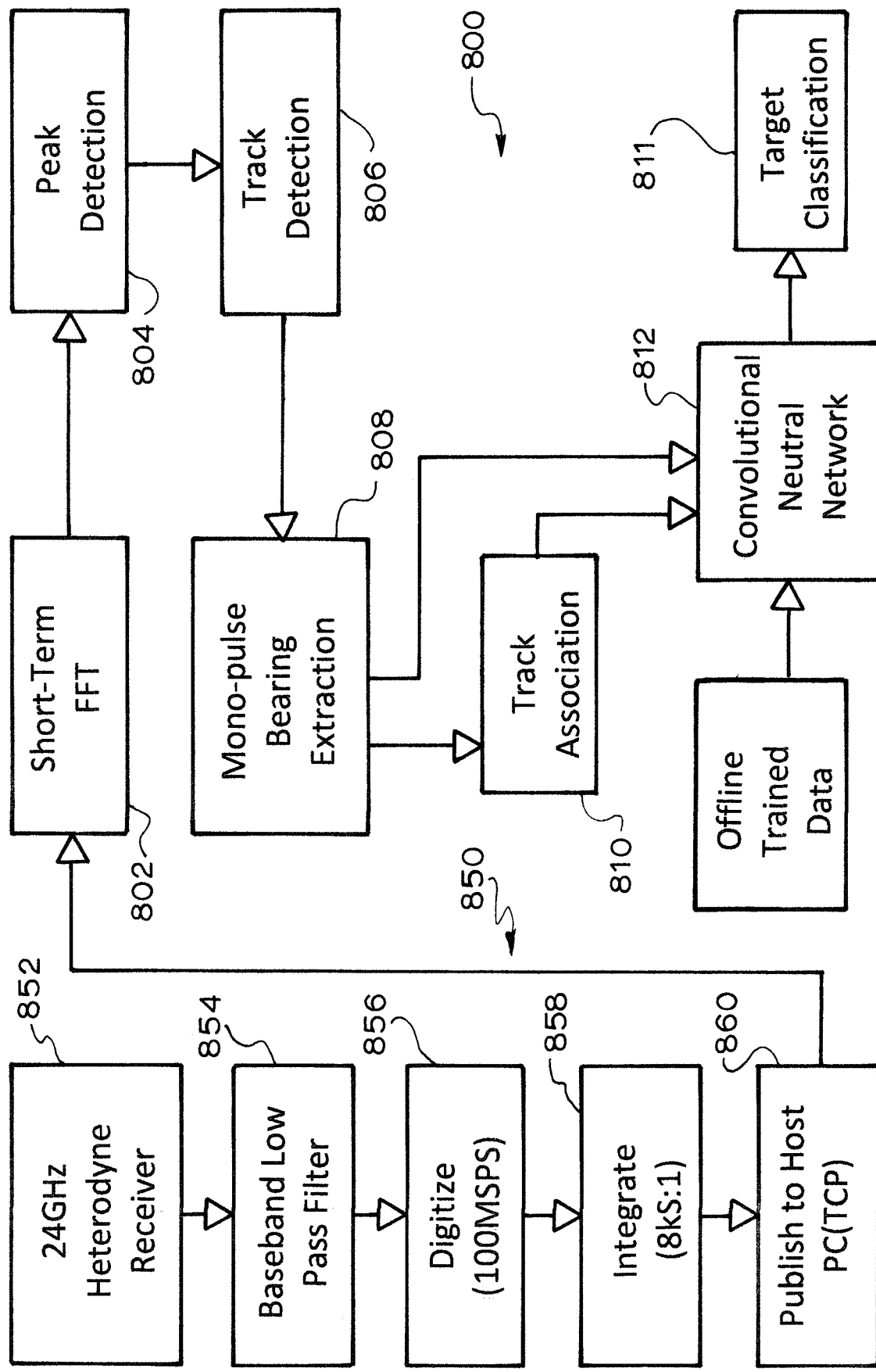
FIG. 8 shows an exemplary embodiment of a method for detecting moving objects.

FIG. 8 shows an exemplary embodiment of a method for detecting moving objects 800 that is executed by components of the object detection system 100. The method 800 is also for classifying a moving object. The method 800 is executed by the central processor 114. The method 800 may be stored in a non-transitory computer readable medium as a set of computer readable instructions that can be executed at least by the processor unit 202 of the central processor 114. The non-transitory computer readable medium can be for example the ROM 204 or RAM 206 or another disk drive 208.

The method 800 commences upon receiving a digitised signal from the receiver at each node, the signals containing offset frequency information representative of Doppler spectra.

The method 800 comprises applying a sliding window short-time Fast Fourier Transform to the digitised signals, step 802. Alternatively, other spectral estimation techniques may be used. This step may be carried out by the node processors or the local processors 110. The Fast Fourier transform (FFT) can be used to generate Doppler spectrograms or "waterfall plots" of the object Doppler spectra and to determine the frequency response of the object as it was detected by the various receivers in the system. One or more Doppler characteristics can be identified by performing a FFT, such as for example peaks at frequencies due to Doppler shift from the transmitted frequency. The transmitter is configured to transmit radar signals (e.g. radio signals) at a specific frequency. The receiver data will include a different frequency signal due to reflection off the object.

Step 804 comprises applying peak detection to the frequency plots to identify any peaks. The peaks relating the frequency of Doppler spectra. Peak detection enables the determination of Doppler spectra frequencies, and based on the location of the peaks in frequency, determination of the Doppler shift.

Step 806 comprises applying track detection to the data generated by the Fast Fourier Transform. Track detection ensures that short duration frequency spikes that are most likely due to noise/interference are not processed. A filter can be tuned to ensure that a track must be within a certain time-window.

A further step 808 may comprise applying a "monopulse" bearing extraction filter to extract the bearing of the object. This can be extracted by processing the data across multiple nodes and across multiple time intervals to extract a bearing of the object based on radial Doppler spectra.

The local processor 110 then uses the peak detection, track detection, and bearing information to perform track association to determine a trajectory i.e. track of the object as it is moving, step 810. Track association enables identification of a target as it is detected by multiple nodes, either simultaneously or sequentially in time, based on trajectory information calculated by a multi-hypothesis tracker, e.g. a particle filter. The trajectory may be determined by the variations in the frequency detected by the receiver across a number of time intervals. The time intervals may be the sampling frequency of the receivers at the nodes after integration. Any one Doppler frequency may be produced by a number of instantaneous velocities. But these ambiguities may be reduced or removed by considering the evolution of different trajectories over time, from multiple view-points.

The local processor 110 or the node processors is/are configured to determine the trajectories by processing the frequencies determined.

The detected objects are classified by the local processor 110 by using one or more machine learning algorithms. One example of a machine learning algorithm that is implemented by and executed by the local processor 110 is a neural network. Preferably a Convolutional Neural Network is implemented by the local processor 110 to classify the type of object. Alternatively, a Recurrent Neural Network may be implemented by the local processor 110 to classify the type of object that was detected.

In the present embodiment, step 812 comprises applying a machine learning filter or algorithm to the frequency data generated from the FFT, for example to the Doppler spectrogram/"waterfall plot". The machine learning filter is preferably a Convolutional Neural Network that is efficient and suited for image processing. The Convolutional Neural Network compares detected Doppler characteristics (e.g. spectrogram data) with known Doppler characteristics. The known Doppler characteristics may be Doppler characteristics that relate to known objects i.e. objects not of interest such as for example birds or moving branches of trees etc. If the Doppler characteristics of the detected signals do no correlate to one known characteristic or signature, then an alert is triggered because the object is identified as an object of interest e.g. a golf ball or a tennis ball. Machine learning will be used to take into account the variation from a true ballistic trajectory expected under varying wind conditions and local environmental effects Alternatively or additionally, the known Doppler characteristics may include data for objects of interest such as different types of projectiles, or UAVs. The Doppler characteristics of the detected signals may then be correlated with a known object type, and an alert triggered and/or information conveyed based on the correlation.

Alternatively, the machine learning may utilise a Recurrent Neural Network (RNN). RNNs operate on sequential time-domain data for pattern identification, e.g. voice recognition on audio speech. An RNN trained on the raw received radar signal could, based on suitable training data, identify and classify certain target types based on this input data alone.

Doppler characteristics are generated for known objects and then used as offline training data for the Neural Network such that the Neural Network can identify if there is a correlation between the Doppler characteristics of a detected signal and known Doppler characteristics. Learning new objects/classes may involve collecting ground-truth data at a dedicated test facility where conditions can be well controlled.

Figure 10A:
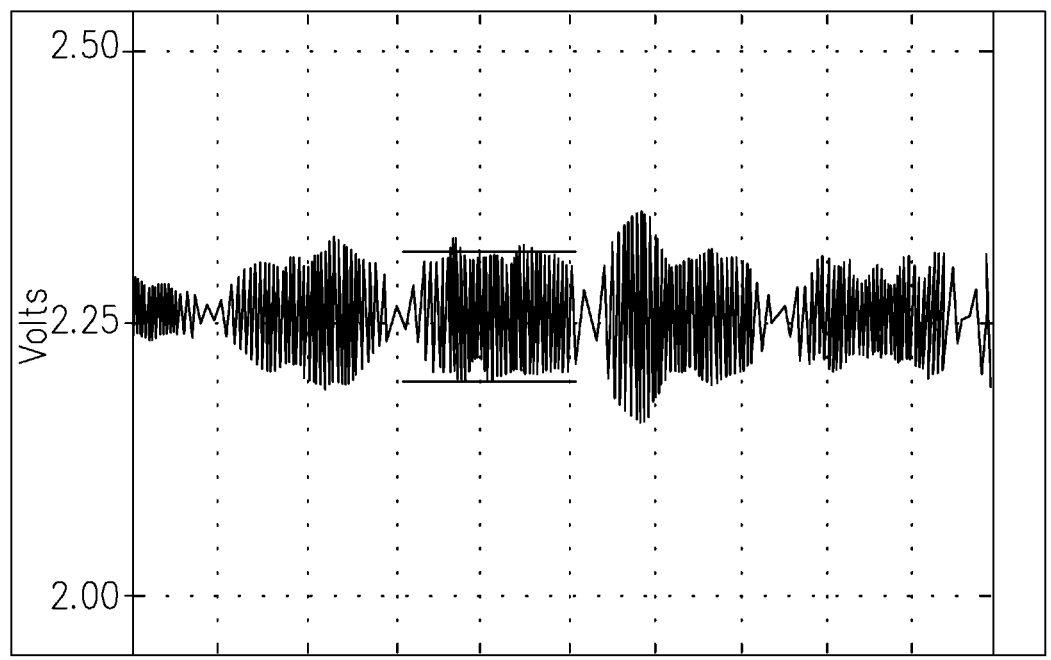
FIG. 10(a) shows the measured Doppler signal for a tennis ball being swung in front of a node, and 10(b) shows the measured Doppler signal for a small metal sphere being swung in front of a node.
Figure 10B:
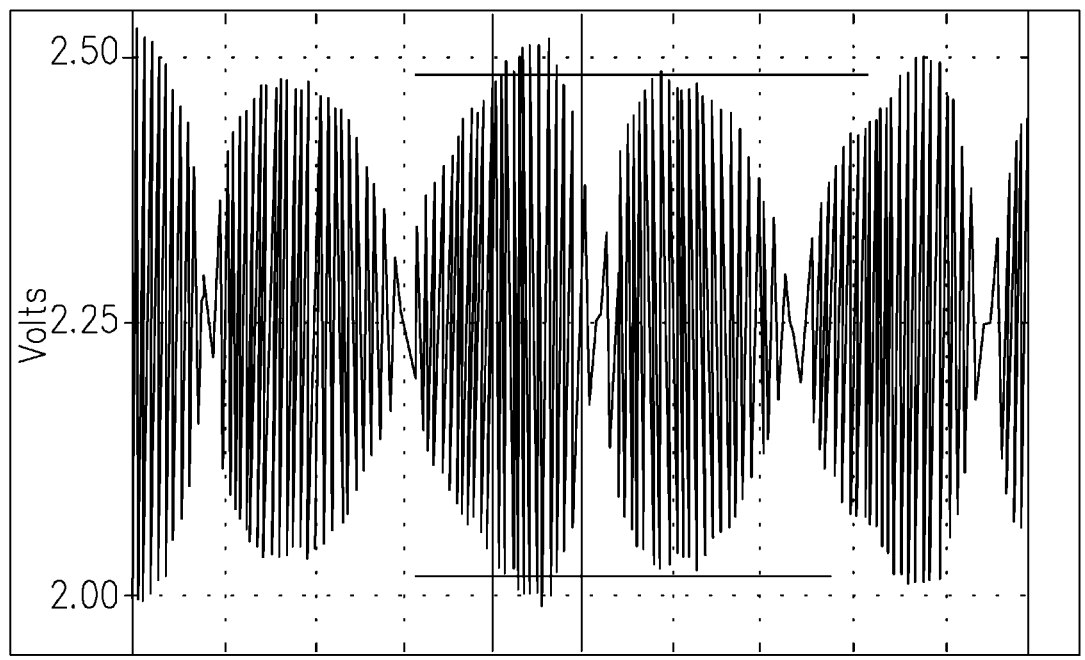

Doppler characteristics may be different for objects with different RCSs. For example, FIGS. 10(a) and (b) show the measured Doppler signal for a small metal sphere (FIG. 10(b)) compared to a tennis ball (FIG. 10(a)) that is larger in size but having a smaller RCS. For these plots, the respective balls were swung forward and back in front of a node. Different trajectories and flight styles also produce different Doppler characteristics. For example, FIG. 12A shows a waterfall plot showing track detection of a tennis ball in the presence of other slow-moving clutter, FIG. 12B shows a waterfall plot showing track detection of a Frisbee; and FIG. 12C shows a waterfall plot showing track detection of a Frisbee where the Frisbee is tumbling to create micro Doppler effects. This data is preferably communicated to a user on a GUI such as the exemplary GUI in FIGS. 11A-D.

Figure 11B:
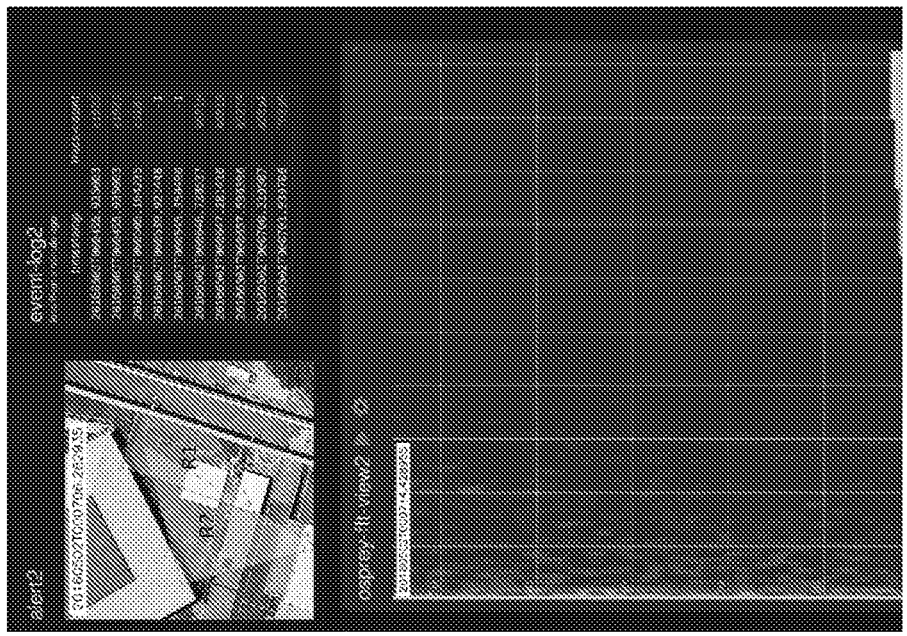
FIGS. 11A and 11B show a GUI for an exemplary embodiment system, showing detection of a bird.
Figure 11A:
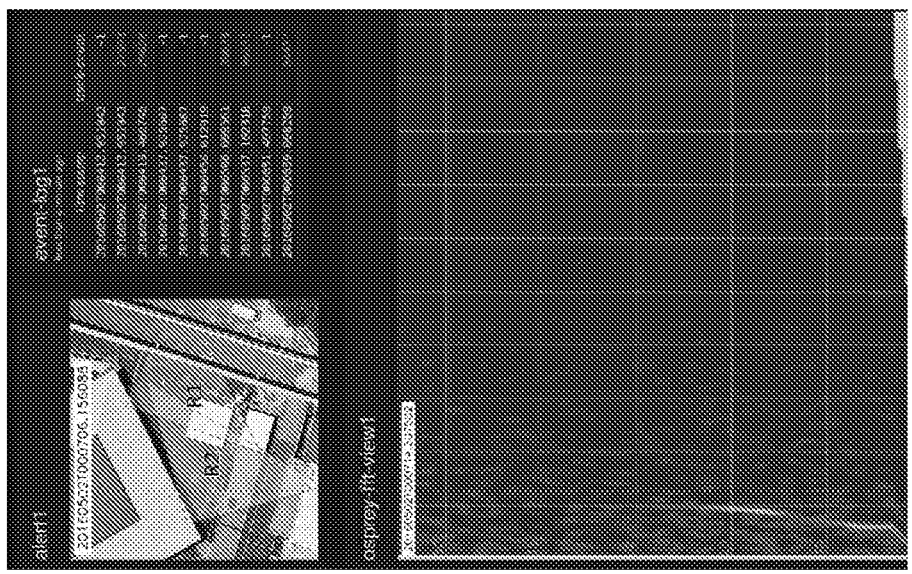
Figure 11D:
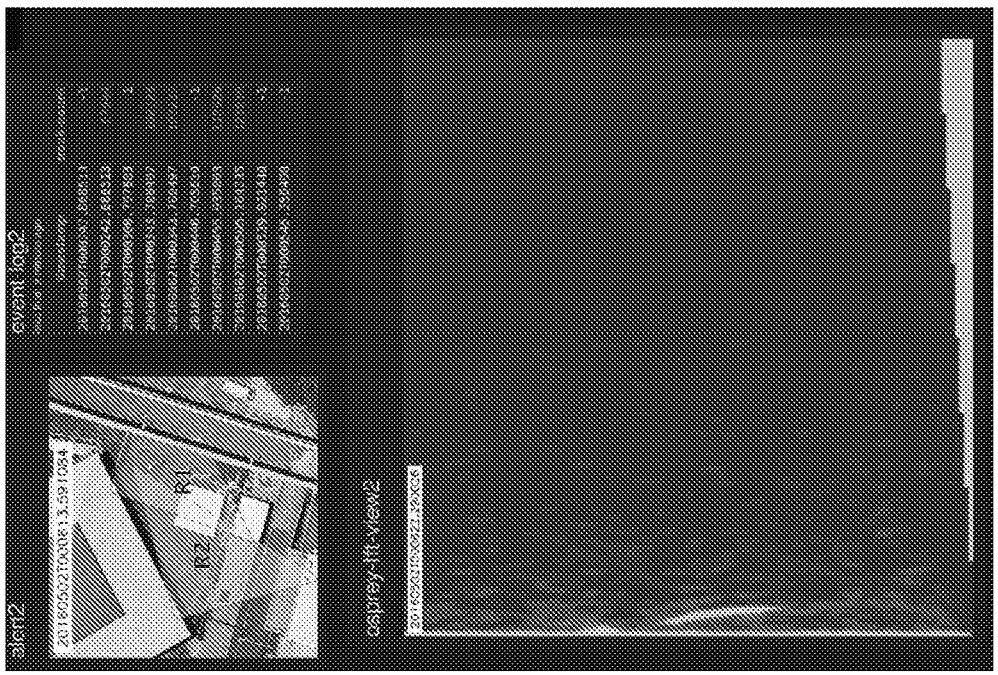
FIGS. 11C and 11D show a GUI for an exemplary embodiment system, showing detection of a tennis ball.
Figure 11C:
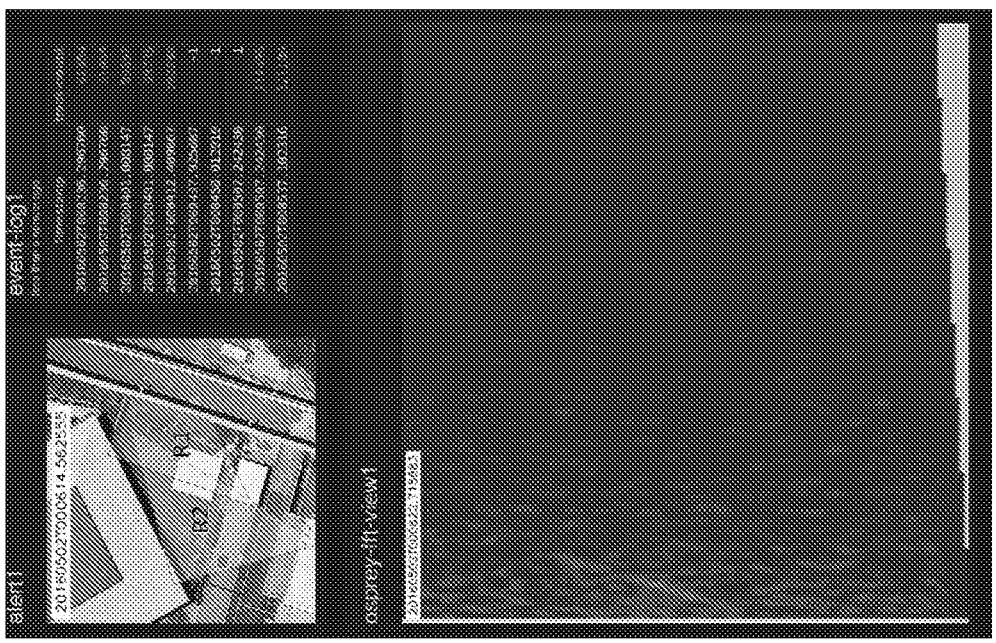
Figure 12A:
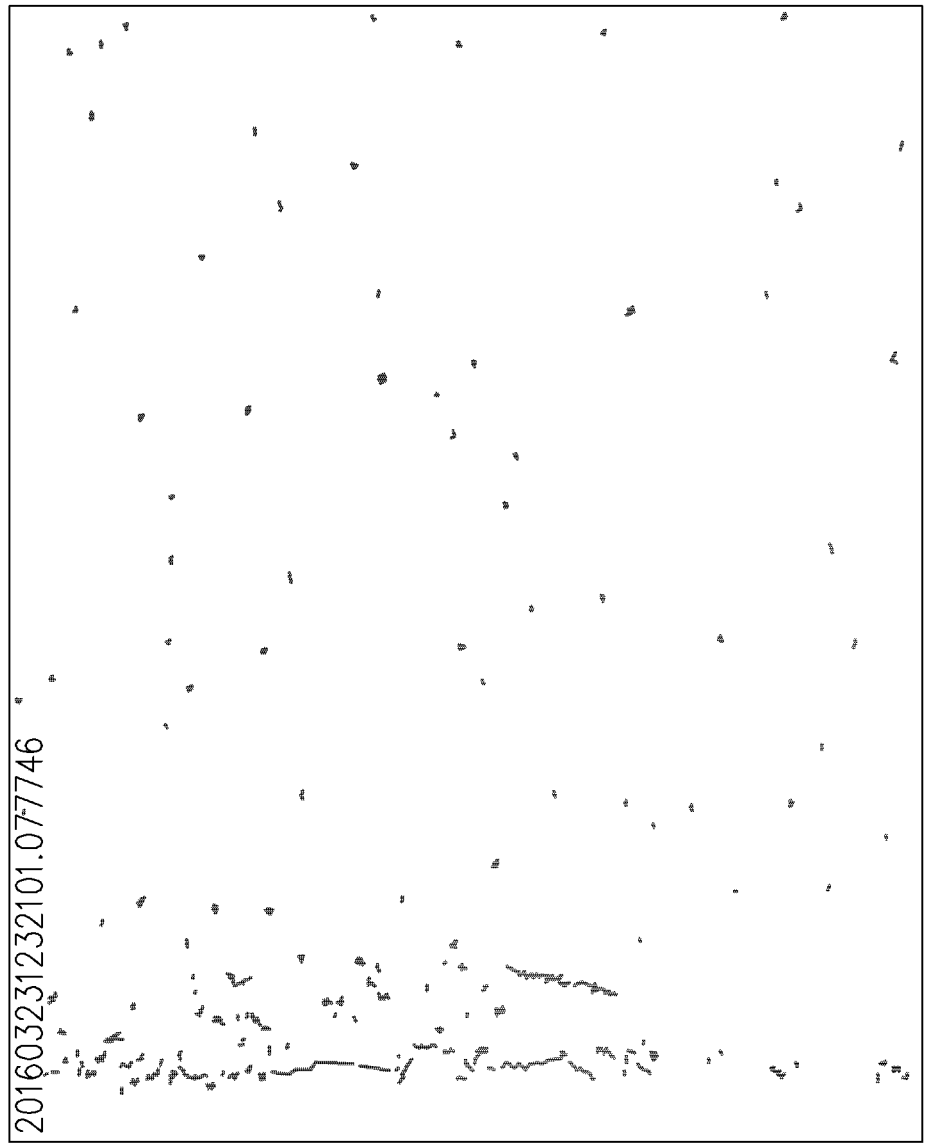
FIG. 12A is a waterfall plot showing track detection of a tennis ball in the presence of other slow-moving clutter.
Figure 12B:
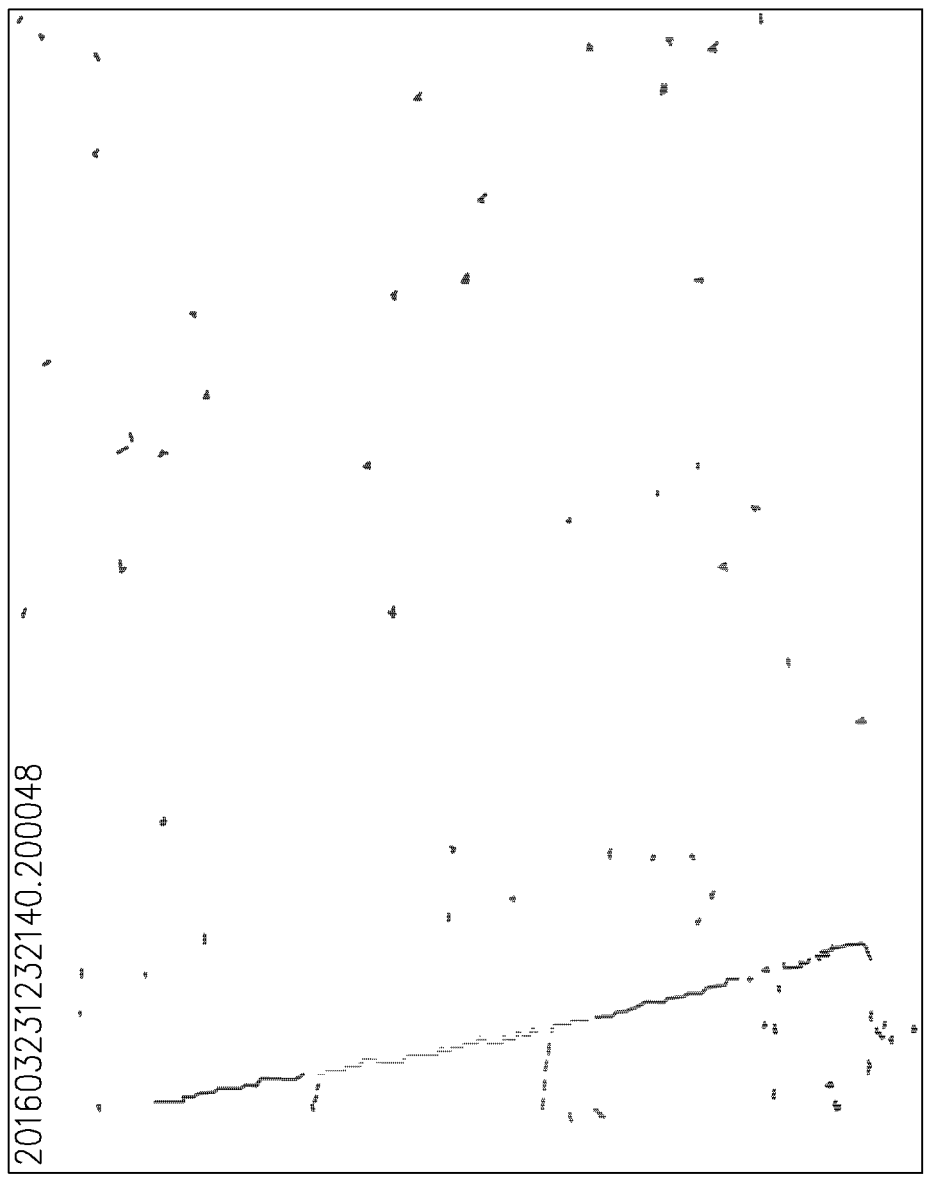
FIG. 12B is a waterfall plot showing track detection of a Frisbee.
Figure 12C:
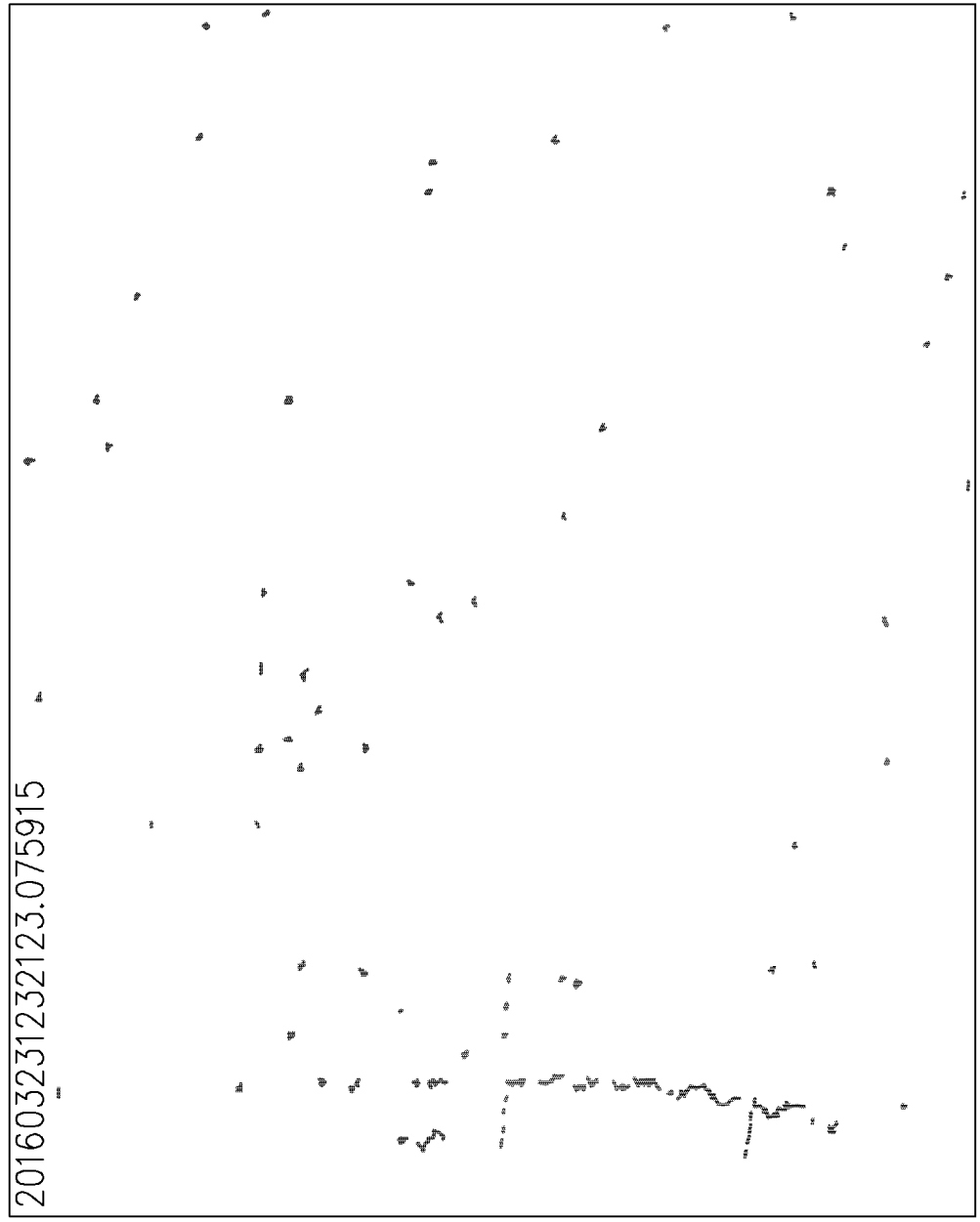
FIG. 12C is a waterfall plot showing track detection of a Frisbee where the Frisbee is tumbling to create micro Doppler effects.

FIGS. 11A and 11B show detection of a bird, and FIGS. 11C and 11D show detection of a tennis ball.

The known Doppler characteristics may be access from the database 220 by the processing unit 202. Step 814 comprises target classification i.e. object classification. If the object is identified as not being one of the known objects then an alert can be sent or an alarm can be sounded. In one example the local client GUI 118 may receive a visual message or an audible message or both. Further, if an unauthorised object i.e. an object of interest is detected then other remote computing device 122 such as guards' mobile devices may also receive a message from the central processor 114 regarding the detection of an unauthorised object. The central or local processor 114, 110 may be configured to detect the location of where the object came from and transmit this information to a local device 118 or to other remote computing devices 122. The location is based on the particular nodes that detected an object of interest i.e. an unauthorised object. Each node may be designated an identifier number and the central processor 114 may be configured to determine the exact nodes that detected an unauthorised object.

FIG. 8 further shows an optional pre-processing method 850 that is executed for each node by the local processor(s) 110. The method 850 comprises the step 852 of receiving frequency signals at a 24 GHz Heterodyne receiver. The receivers that form part of the antennas, at each node, may each be a 24 GHz Heterodyne receiver. Step 854 comprises passing the received data through a baseband low pass filter for noise reduction and noise filtering. The received signal is an analogue signal. Step 856 comprises digitising the received signal with a sampling frequency of 100 MSPS (million samples per second). Since the data is digitised, the data is over sampled and integrated to reduce noise, at step 858. The factor by which the data is oversampled can be varied according to the integration level. The oversampling/integration ratio relative to the Nyquist frequency, i.e. the maximum detectable Doppler target frequency, can be varied in software. In one embodiment, data is oversampled with a ratio of 8 kS to 1.

The receiver digital data is then transmitted to the central processor 114 (step 860) i.e. publishing the digital signals to the host PC For example via an Ethernet or Wi-Fi connection. The method 850 is optionally executed by the local processor 110 or may alternatively be executed by the central processor 114.

The system and method of detecting a moving object in accordance with the present disclosure may be advantageous because it may allow for detection and classification of small, fast moving objects such as balls or other packages, that may be thrown, or in the case of UAVs, flown over a fence of secured area. Further, the system and method as described herein may allow detection of low density objects, such as tennis balls. The system 100 as described herein may allow detection of low RCS objects of 20 to −45 dBm$^2$ as compared to other systems that only detect higher RCS objects. The described system and method may allow detection of small objects, e.g. having a volume between 25 and 45 cm$^3$. The described system and method of detecting an object may allow detection of small objects i.e. low RCS objects because it may detect the Doppler characteristics across a plurality of nodes that comprise antennas. The described system and method of detecting a moving object may further provide machine learning algorithms to classify detected objects. The use of a neural network may be advantageous because it may provide improved accuracy in classifying the object and the neural network may process any detected object. Further the neural network has the ability to learn by providing it with additional training data to increase the classification range of the system.

Preferred embodiments have been described by way of example only and modifications may be made thereto without departing from the scope of the disclosure.

For example, one or more of the nodes may comprise a plurality of transceivers, the transceivers transmitting at different frequencies, for example 15 kHz to 50 kHz apart from each other to reduce interference.

In a further alternative embodiment, the transmitter signals may be pulsed (rather than being continuous) such that the pulsing repetition frequency (PRF) is at least twice that of the highest Doppler frequency to be detected, and the system is coherent, i.e. the phase of the transmitted signals is maintained between transmit pulses. The pattern and gain of the antennas in the individual nodes do not have any bearing on whether it is possible to transmit and receive from adjacent nodes as they operate on separate frequencies.

In an embodiment for capturing UAVs, some parameters of the antennas may need adjustment in a manner that would be apparent to a person skilled in the art. For example, UAVs may move faster than tennis balls so it may be necessary to measure a wider Doppler spectrum. This reduces the integration gain and hence sensitivity. However, this is countered by the larger size of UAVs compared to tennis balls, for example.

The invention claimed is:

1. An object detection system configured to detect objects having a radar cross section of less than 20 dBm$^2$ and more than −45 dBm$^2$ comprising a plurality of nodes, each node having a transmitter configured to transmit a radar signal as a radar beam, and one or more receivers configured to receive a reflected radar signal; the nodes and transmitters being arranged such that the radar beam of one transmitter at least partly overlaps with the radar beam from the transmitter at an adjacent one of the nodes; the system comprising a processor configured to receive a digitized signal from each node, process the digitized signal to detect characteristics of any Doppler effects created by the movement of an object through one or more of the radar beams, compare the Doppler characteristics with Doppler signatures associated with known objects, and thereby classify the object, wherein the transmitted radar signals comprise continuous wave radar signals.

2. The object detection system of claim 1, wherein the transmitted radar signals are constant-frequency radar signals, and wherein the signals of any two overlapping beams have different frequencies.

3. The object detection system of claim 1, wherein:
   one or more of the nodes comprises two receivers in a monopulse configuration;
   the processor is configured to extract bearing information from the digitized signal; or
   any two adjacent receivers at respective adjacent nodes are angled towards each other.

4. The object detection system of claim 1, wherein the processor is configured to process the digital signal by applying fast Fourier transforms (FFTs) and wherein the processor is configured to further process the digital signal by applying peak and/or track detection.

5. The object detection system of claim 1, wherein the processor is a central processor and each node further comprises a node processor configured to sample, filter, and digitize the signal from the respective receiver(s), and transmit the digitized signal(s) to a local processor, and wherein the nodes are linked to the local processor over a communications link.

6. The object detection system of claim 1, wherein the transmitted radar signals each have a horizontal beam width of 70 to 90 degrees and wherein the transmitted radar signals each comprise radio signals having a frequency that is between about 10 GHz and about 100 GHz.

7. The object detection system of claim 6, wherein the transmitted radar signals each comprise radio signals having a frequency that is between about 24 GHz and about 24.25 GHz.

8. The object detection system of claim 1, wherein the receiver(s) and transmitter at each node are housed in a unit and mounted on, at, or adjacent to a perimeter fence, such that the node extends above the perimeter fence, and wherein the nodes are spaced 15m to 60m apart.

9. The object detection system of claim 8, wherein the nodes are spaced 20m to 30m apart.

10. A method for detecting moving objects having a radar cross section of less than 20 dBm$^2$ and, the method comprising:
providing a plurality of nodes, each node having a transmitter transmitting a radar signal as a radar beam, and one or more receivers to sense a reflected radar signal, the transmitters being arranged such that the radar beam of one transmitter at least partly overlaps with the radar beam from the transmitter at an adjacent one of the nodes;
receiving and digitizing signals from the receivers;
processing the digitized signals to detect characteristics of any Doppler effects created by the movement of an object through one or more of the radar beams;
comparing the detected Doppler characteristics with Doppler signatures associated with known objects to classify the object; and
triggering an alert upon the classification of the object, wherein the transmitters each transmit continuous wave radar signals.

11. The method of claim 10, wherein the transmitters each transmit constant-frequency radar signals, and the signals of any two overlapping beams have different frequencies, and wherein one or more of the nodes comprises two receivers in a monopulse configuration, and the step of processing the signal comprises extracting bearing information.

12. The method of claim 10, wherein data from each receiver is oversampled,
wherein the step of processing the signal comprises applying short-time fast Fourier transforms, and
wherein the step of processing the signal comprises creating Doppler spectrograms, and the spectrograms are compared to Doppler spectrograms associated with known objects, and
wherein the step of processing the signal comprises applying peak and/or track detection.

13. The method of claim 10, wherein the step of processing the digitized signals is performed by a central processor, and further comprising the step of sampling, filtering, and digitizing the signal from each receiver at a respective node processor, and transmitting the digitized signals to a local processor.

14. The method of claim 10, wherein the transmitted radar signals each have a horizontal beam width of 70 to 90 degrees, and wherein the transmitted radar signals each have a frequency that is between about 24 GHz and about 24.25 GHz.

15. The method of claim 10, further comprising comparing the detected Doppler characteristics with known Doppler signatures associated with known objects of interest; and, in the case that the characteristics correlate to one such known object, triggering the alert.

16. The method of claim 10, comprising training a processor to recognize known objects using machine learning.

17. A method for detecting moving objects, comprising:
providing a plurality of nodes, each node having a transmitter transmitting a radar signal as a radar beam, and one or more receivers to sense a reflected radar signal, the transmitters being arranged such that the radar beam of one transmitter at least partly overlaps with the radar beam from the transmitter at an adjacent one of the nodes;
receiving and digitizing signals from the receivers;
processing the digitized signals to detect characteristics of any Doppler effects created by the movement of an object through one or more of the radar beams;
comparing the detected Doppler characteristics with known Doppler signatures associated with known objects not of interest to classify the object; and
in the case that the characteristics do not correlate to one such known object, triggering an alert upon the classification of the object, wherein the transmitters each transmit continuous wave radar signals.

* * * * *

UNITED STATES PATENT AND TRADEMARK OFFICE
CERTIFICATE OF CORRECTION

| | | |
|---|---|---|
| PATENT NO. | : 11,467,278 B2 | Page 1 of 1 |
| APPLICATION NO. | : 16/627262 | |
| DATED | : October 11, 2022 | |
| INVENTOR(S) | : Graham Brooker et al. | |

It is certified that error appears in the above-identified patent and that said Letters Patent is hereby corrected as shown below:

In the Claims

Column 19, Claim 10, Line 21:
"20 $dBm^2$ and, the method comprising"
Should read:
--20 $dBm^2$ and more than -45 $dBm^2$, the method comprising--.

Signed and Sealed this
Twenty-sixth Day of November, 2024

Katherine Kelly Vidal
*Director of the United States Patent and Trademark Office*